United States Patent
Purkayastha et al.

(10) Patent No.: US 12,035,299 B2
(45) Date of Patent: Jul. 9, 2024

(54) SCHEDULING COMMUNICATION FOR MULTIPLE SUBSCRIBER IDENTITY MODULES OVER A SINGLE COMMUNICATION LINK

(71) Applicant: QUALCOMM Incorporated, San Diego, CA (US)

(72) Inventors: Punyaslok Purkayastha, San Diego, CA (US); Ozcan Ozturk, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 17/398,884

(22) Filed: Aug. 10, 2021

(65) Prior Publication Data

US 2022/0053520 A1    Feb. 17, 2022

Related U.S. Application Data

(60) Provisional application No. 63/065,343, filed on Aug. 13, 2020.

(51) Int. Cl.
*H04W 72/1263*  (2023.01)
*H04W 72/23*    (2023.01)
*H04W 76/10*    (2018.01)

(52) U.S. Cl.
CPC ....... *H04W 72/1263* (2013.01); *H04W 72/23* (2023.01); *H04W 76/10* (2018.02)

(58) Field of Classification Search
CPC . H04W 72/1263; H04W 72/23; H04W 76/10; H04W 60/005; H04W 76/11; H04W 8/183
See application file for complete search history.

(56) References Cited

U.S. PATENT DOCUMENTS

2016/0043849 A1*  2/2016  Lee .............. H04L 5/0053
                                                  370/329
2020/0351818 A1* 11/2020  Park ............ H04W 4/90
(Continued)

FOREIGN PATENT DOCUMENTS

WO      2016191916 A1    12/2016
WO   WO-2016191916 A1 * 12/2016  ............ H04W 56/00
(Continued)

OTHER PUBLICATIONS

International Search Report and Written Opinion—PCT/US2021/045494—ISA/EPO—dated Dec. 2, 2021.

*Primary Examiner* — Michael K Phillips
(74) *Attorney, Agent, or Firm* — Loza & Loza, LLP

(57) ABSTRACT

Aspects of the disclosure relate to scheduling communication between a user equipment (UE) and a base station when connections using multiple subscriptions of the UE is established via a communication link. In an aspect, the UE may establish a first connection with a base station via a communication link using a first subscription, and may establish a second connection with the base station via the communication link using a second subscription. Further, the UE may receive, from the base station, scheduling information for data communication, the scheduling information including one of an uplink scheduling grant and a downlink scheduling assignment, and may receive a subscription indicator indicating at least one of the first subscription or the second subscription to be used for the data communication over the communication link based on the scheduling information.

24 Claims, 14 Drawing Sheets

(56) References Cited

U.S. PATENT DOCUMENTS

| | | | |
|---|---|---|---|
| 2021/0014667 A1* | 1/2021 | Lovlekar | H04W 8/183 |
| 2021/0337625 A1* | 10/2021 | Tsai | H04W 76/30 |
| 2023/0189212 A1* | 6/2023 | Chen | H04W 68/12 |
| | | | 455/458 |
| 2023/0239941 A1* | 7/2023 | Selvaganapathy | H04W 8/26 |
| | | | 370/328 |

FOREIGN PATENT DOCUMENTS

| | | | |
|---|---|---|---|
| WO | 2018141081 A1 | | 8/2018 |
| WO | WO-2018141081 A1 | * | 8/2018 |
| WO | WO-2021255577 A1 | * | 12/2021 |

* cited by examiner

SCHEDULING COMMUNICATION FOR MULTIPLE SUBSCRIBER IDENTITY MODULES OVER A SINGLE COMMUNICATION LINK

PRIORITY CLAIM

This application claims priority to and the benefit of provisional patent application No. 63/065,343 filed in the United States Patent & Trademark Office on Aug. 13, 2020, the entire content of which is incorporated herein by reference as if fully set forth below in its entirety and for all applicable purposes.

TECHNICAL FIELD

The technology discussed below relates generally to wireless communication systems, and more particularly, to scheduling communication between a user equipment and a base station using multiple subscriptions via a single communication link.

INTRODUCTION

A user equipment (UE) often uses a subscription to connect to a service network, which provides one or more services such as a voice call service or a data service. For example, a subscription used by the UE may be associated with a subscription module or device such as a subscriber identity module (SIM) that the UE accesses to use the subscription. With development of the subscription based services, a UE that is capable of using two or more subscriptions are increasingly used. In one example, a UE may implement a dual SIM that allows the UE to connect to a service network using two different subscriptions respectively provided by two SIMs. Various Improvements for a UE configured to use multiple subscriptions are being studied.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to scheduling communication between a user equipment (UE) and a base station when connections using multiple subscriptions of the UE is established via a communication link Because scheduling the communication using multiple subscriptions over a single communication has not been explored, various aspects of the disclosure provide approaches for scheduling the communication in such a configuration.

In one example, a method of wireless communication by a UE is disclosed. The method includes establishing a first connection with a base station via a communication link using a first subscription, establishing a second connection with the base station via the communication link using a second subscription, receiving, from the base station, scheduling information for data communication, the scheduling information including one of an uplink scheduling grant and a downlink scheduling assignment, and receiving a subscription indicator indicating at least one of the first subscription or the second subscription to be used for the data communication over the communication link based on the scheduling information. In an aspect, the first connection may be a first radio resource control (RRC) connection and the second connection is a second RRC connection.

In another example, a UE for wireless communication is disclosed. The UE includes at least one processor, a transceiver communicatively coupled to the at least one processor, and a memory communicatively coupled to the at least one processor. The at least one processor may be configured to establish a first connection with a base station via a communication link using a first subscription, establish a second connection with the base station via the communication link using a second subscription, receive, from the base station, scheduling information for data communication, the scheduling information including one of an uplink scheduling grant and a downlink scheduling assignment, and receive a subscription indicator indicating at least one of the first subscription or the second subscription to be used for the data communication over the communication link based on the scheduling information.

In another example, a non-transitory processor-readable storage medium having instructions for a UE thereon may be disclosed. The instructions, when executed by a processing circuit, cause the processing circuit to establish a first connection with a base station via a communication link using a first subscription, establish a second connection with the base station via the communication link using a second subscription, receive, from the base station, scheduling information for data communication, the scheduling information including one of an uplink scheduling grant and a downlink scheduling assignment, and receive a subscription indicator indicating at least one of the first subscription or the second subscription to be used for the data communication over the communication link based on the scheduling information.

In a further example, a UE for wireless communication may be disclosed. The base station includes means for establishing a first connection with a base station via a communication link using a first subscription, means for establishing a second connection with the base station via the communication link using a second subscription, means for receiving, from the base station, scheduling information for data communication, the scheduling information including one of an uplink scheduling grant and a downlink scheduling assignment, and means for receiving a subscription indicator indicating at least one of the first subscription or the second subscription to be used for the data communication over the communication link based on the scheduling information.

In one example, a method of wireless communication by a base station is disclosed. The method includes establishing a first connection with a UE via a communication link using a first subscription of the UE, establishing a second connection with the UE via the communication link using a second subscription of the UE, transmitting, to the UE, scheduling information for data communication, the scheduling information including one of an uplink scheduling grant and a downlink scheduling assignment, and transmitting a subscription indicator indicating at least one of the first subscription or the second subscription that is associated with the data communication to be performed over the communication link based on the scheduling information. In an aspect, the first connection is a first RRC connection and the second connection is a second RRC connection.

In another example, a base station for wireless communication is disclosed. The base station includes at least one processor, a transceiver communicatively coupled to the at least one processor, and a memory communicatively coupled to the at least one processor. The at least one processor may be configured to establish a first connection with a UE via a communication link using a first subscription of the UE, establish a second connection with the UE via the communication link using a second subscription of the UE, transmit, to the UE, scheduling information for data communication, the scheduling information including one of an uplink scheduling grant and a downlink scheduling assignment, and transmit a subscription indicator indicating at least one of the first subscription or the second subscription that is associated with the data communication to be performed over the communication link based on the scheduling information.

In another example, a non-transitory processor-readable storage medium having instructions for a base station thereon may be disclosed. The instructions, when executed by a processing circuit, cause the processing circuit to establish a first connection with a UE via a communication link using a first subscription of the UE, establish a second connection with the UE via the communication link using a second subscription of the UE, transmit, to the UE, scheduling information for data communication, the scheduling information including one of an uplink scheduling grant and a downlink scheduling assignment, and transmit a subscription indicator indicating at least one of the first subscription or the second subscription that is associated with the data communication to be performed over the communication link based on the scheduling information.

In a further example, a base station for wireless communication may be disclosed. The base station includes means for establishing a first connection with a user equipment (UE) via a communication link using a first subscription of the UE, means for establishing a second connection with the UE via the communication link using a second subscription of the UE, means for transmitting, to the UE, scheduling information for data communication, the scheduling information including one of an uplink scheduling grant and a downlink scheduling assignment, and means for transmitting a subscription indicator indicating at least one of the first subscription or the second subscription that is associated with the data communication to be performed over the communication link based on the scheduling information.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
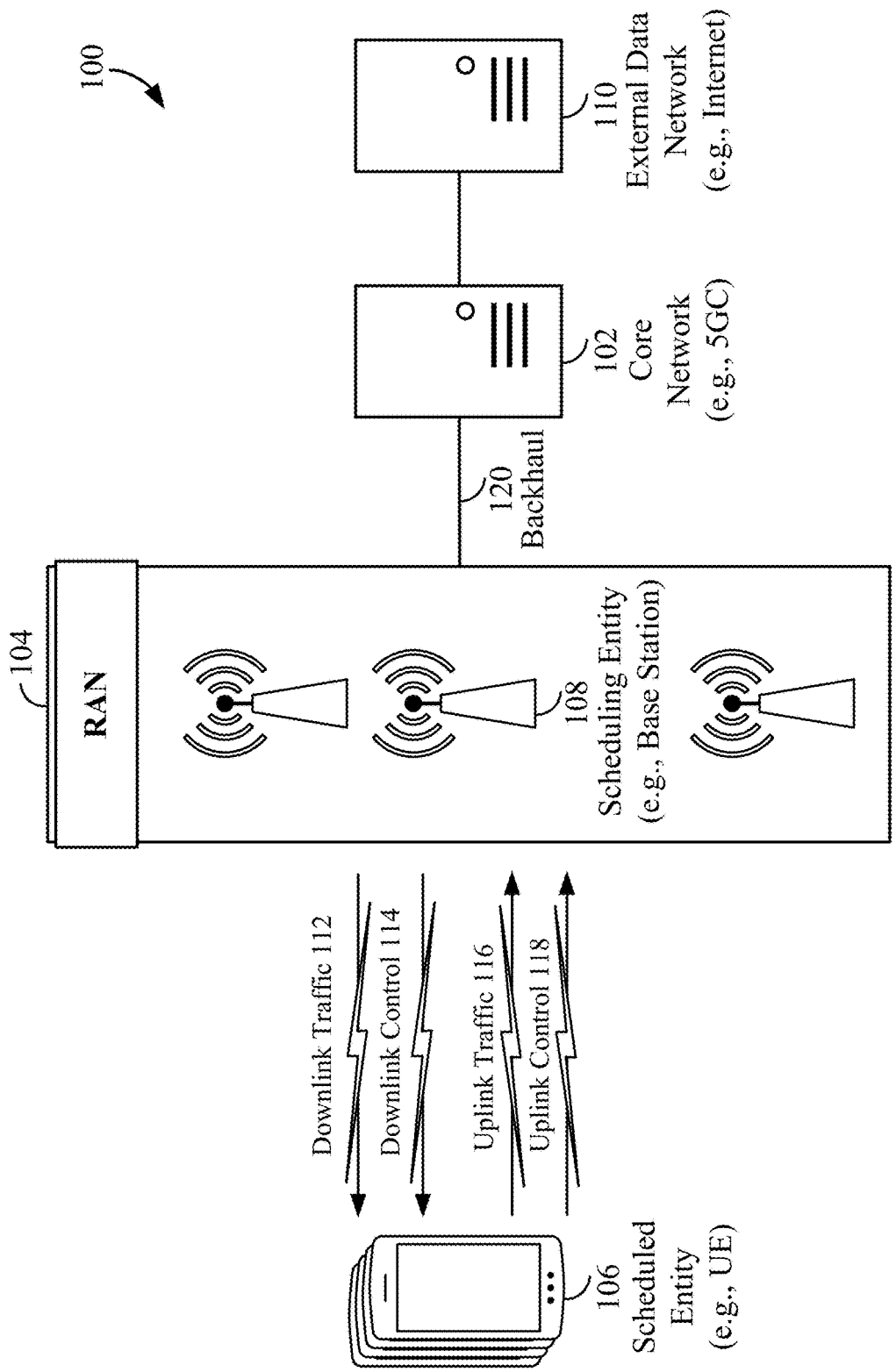
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

A UE capable of communicating using multiple subscriptions has been developed. For example, a UE may include multiple subscriber identity modules (SIMs) that may be used to communicate using multiple subscriptions, respectively. The UE may use the multiple subscriptions to establish multiple connections with a base station using a single communication link. However, scheduling for data communication over the single communication link using the multiple connections of the multiple subscriptions has not been explored.

According to aspects of the disclosure, the UE may establish multiple connections with the base station using multiple subscriptions via a common communication link, and receive scheduling information (e.g., uplink scheduling grant or downlink scheduling assignment) for data communication and a subscription indicator indicating one or more of the multiple subscriptions for the data communication over the common communication link. As such, the UE may schedule/perform the data communication over the communication link based on the scheduling information using the one or more of the multiple subscriptions. Various approaches may be used to schedule the data communication. According to one approach, the data communication may be scheduled for each of the subscriptions separately. According to another approach, the data communication may be scheduled for the subscriptions together.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
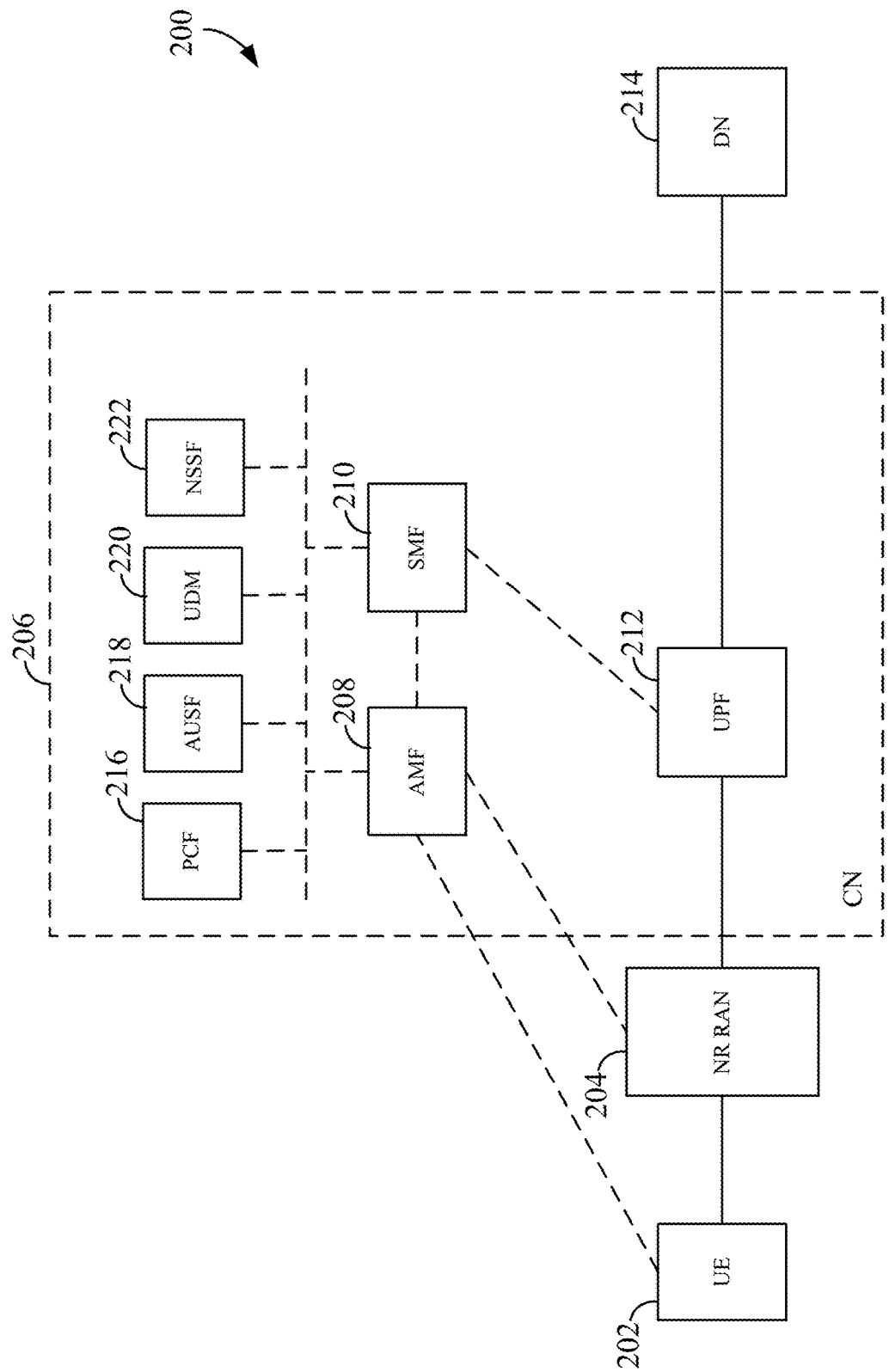
FIG. 2 is a block diagram illustrating an example of a 5G wireless communication system (5GS).

Referring now to FIG. 2, by way of example and without limitation, a block diagram illustrating an example of various components of a 5G wireless communication system (5GS) 200 is provided. In some examples, the 5GS 200 may be the same wireless communication system 100 described above and illustrated in FIG. 1. The 5GS 200 includes a user equipment (UE) 202, a NR RAN 204, and a core network 206. By virtue of the wireless communication system 200, the UE 202 may be enabled to carry out data communication with an external data network 214, such as (but not limited to) the Internet, Ethernet network, an internet protocol (IP) multimedia subsystem (IMS) network, or a local area network.

The core network 206 may include, for example, an access and mobility management function (AMF) 208, a session management function (SMF) 210, and a user plane function (UPF) 212. The AMF 208 and SMF 210 employ control plane (e.g., Non Access Stratum (NAS)) signaling to perform various functions related to mobility management and session management for the UE 202. For example, the AMF 208 provides connectivity, mobility management and authentication of the UE 202, while the SMF 210 provides session management of the UE 202 (e.g., processes signaling related to protocol data unit (PDU) sessions between the UE 202 and the external data network (DN) 214). The UPF 212 provides user plane connectivity to route 5G (NR) packets to/from the UE 202 via the NR RAN 204.

The core network 206 may further include other functions, such as a policy control function (PCF) 216, authentication server function (AUSF) 218, unified data management (UDM) 220, network slice selection function (NSSF) 222, and other functions (not illustrated, for simplicity). The PCF 216 provides policy information (e.g., rules) for control plane functions, such as network slicing, roaming, and mobility management. In addition, the PCF 216 supports 5G quality of service (QoS) policies, network slice policies, and other types of policies. The AUSF 218 performs authentication of UEs 202. The UDM 220 facilitates generation of authentication and key agreement (AKA) credentials, performs user identification and manages subscription information and UE context. In some examples, the AMF 208 includes a co-located security anchor function (SEAF) that allows for re-authentication of a UE 202 when the UE moves between different NR RANs 204 without having to perform a complete authentication process with the AUSF 218. The NSSF 222 redirects traffic to a network slice. Network slices may be defined, for example, for different classes of subscribers or use cases, such as smart home, Internet of Things (IoT), connected car, smart energy grid, etc. Each use case may receive a unique set of optimized resources and network topology (e.g., a network slice) to meet the connectivity, speed, power, and capacity requirements of the use case.

To establish a connection to the 5G core network 206 via the NR RAN 204, the UE 202 may transmit a registration request and PDU session establishment request to the 5G core network 206 via the NR RAN 204. The AMF 208 and SMF 210 may process the registration request and PDU session establishment request and establish a PDU session between the UE 202 and the external DN 214 via the UPF 212. A PDU session may include one or more sessions (e.g., data sessions or data flows) and may be served by multiple UPFs 212 (only one of which is shown for convenience). Examples of data flows include, but are not limited to, IP flows, Ethernet flows and unstructured data flows.

Figure 3:
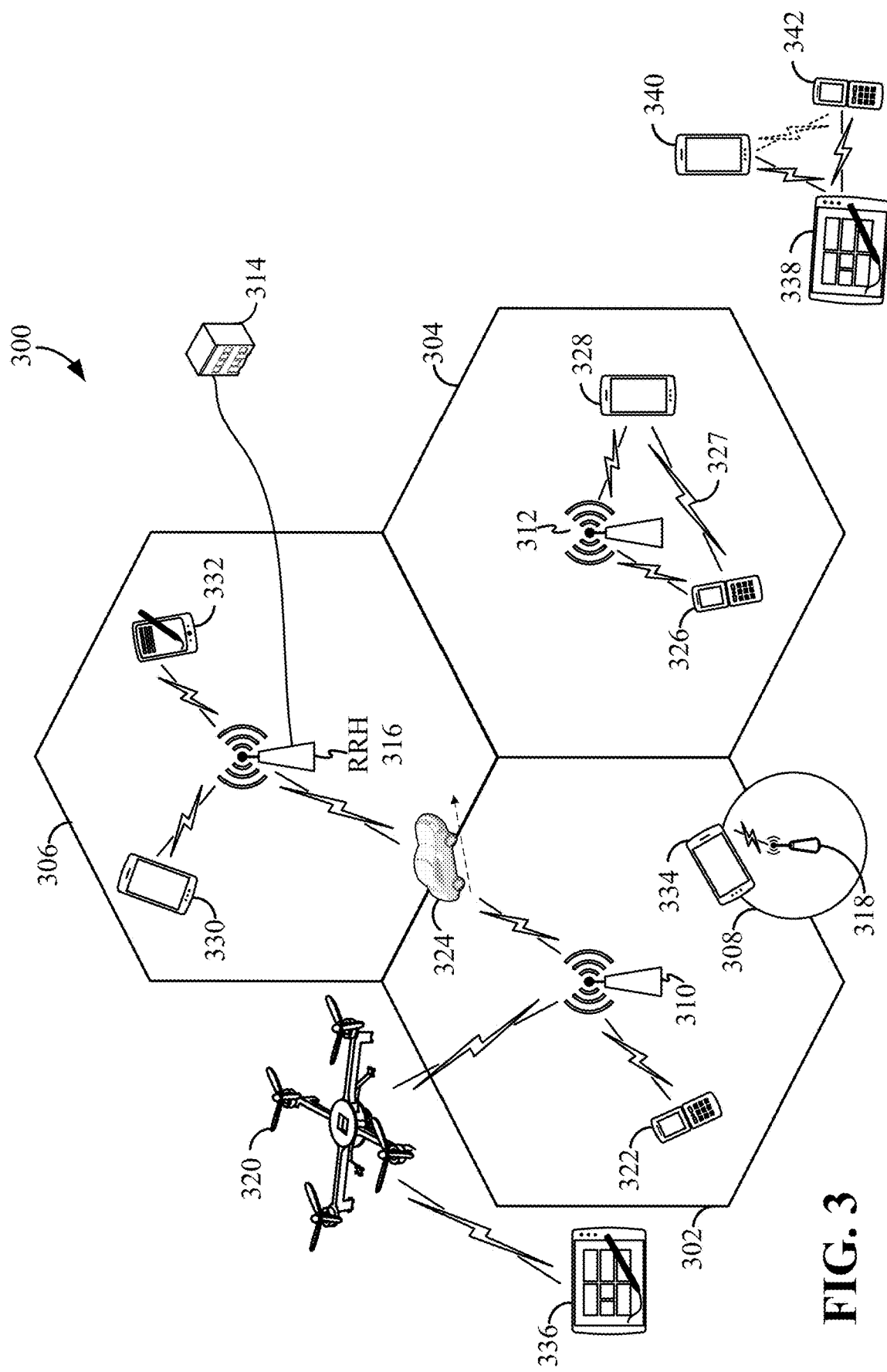
FIG. 3 is a conceptual illustration of an example of a radio access network according to some aspects.

Referring now to FIG. 3, by way of example and without limitation, a schematic illustration of a RAN 300 is provided. In some examples, the RAN 300 may be the same as the RAN 104 described above and illustrated in FIG. 1 and/or the NR RAN 204 described above and illustrated in FIG. 2. The geographic area covered by the RAN 300 may be divided into cellular regions (cells) that can be uniquely identified by a user equipment (UE) based on an identification broadcasted from one access point or base station. FIG. 3 illustrates macrocells 302, 304, and 306, and a small cell 308, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 3, two base stations 310 and 312 are shown in cells 302 and 304; and a third base station 314 is shown controlling a remote radio head (RRH) 316 in cell 306. That is, a base station can have an integrated antenna or can be connected to an antenna or RRH by feeder cables. In the illustrated example, the cells 302, 304, and 126 may be referred to as macrocells, as the base stations 310, 312, and 314 support cells having a large size. Further, a base station 318 is shown in the small cell 308 (e.g., a microcell, picocell, femtocell, home base station, home Node B, home eNode B, etc.) which may overlap with one or more macrocells. In this example, the cell 308 may be referred to as a small cell, as the base station 318 supports a cell having a relatively small size. Cell sizing can be done according to system design as well as component constraints.

It is to be understood that the radio access network 300 may include any number of wireless base stations and cells. Further, a relay node may be deployed to extend the size or coverage area of a given cell. The base stations 310, 312, 314, 318 provide wireless access points to a core network for any number of mobile apparatuses. In some examples, the base stations 310, 312, 314, and/or 318 may be the same as the base station/scheduling entity 108 described above and illustrated in FIG. 1.

FIG. 3 further includes a quadcopter or drone 320, which may be configured to function as a base station. That is, in some examples, a cell may not necessarily be stationary, and the geographic area of the cell may move according to the location of a mobile base station such as the quadcopter 320.

Within the RAN 300, the cells may include UEs that may be in communication with one or more sectors of each cell. Further, each base station 310, 312, 314, 318, and 320 may be configured to provide an access point to a core network 102 (see FIG. 1) for all the UEs in the respective cells. For example, UEs 322 and 324 may be in communication with base station 310; UEs 326 and 328 may be in communication with base station 312; UEs 330 and 332 may be in communication with base station 314 by way of RRH 316; UE 334 may be in communication with base station 318; and UE 336 may be in communication with mobile base station 320. In some examples, the UEs 322, 324, 326, 328, 330, 332, 334, 336, 338, 340, and/or 342 may be the same as the UE/scheduled entity 106 described above and illustrated in FIG. 1.

In some examples, a mobile network node (e.g., quadcopter 320) may be configured to function as a UE. For example, the quadcopter 320 may operate within cell 302 by communicating with base station 310.

In a further aspect of the RAN 300, sidelink signals may be used between UEs without necessarily relying on scheduling or control information from a base station. For example, two or more UEs (e.g., UEs 326 and 328) may communicate with each other using peer to peer (P2P) or sidelink signals 327 without relaying that communication through a base station (e.g., base station 312). In a further example, UE 338 is illustrated communicating with UEs 340 and 342. Here, the UE 338 may function as a scheduling entity or a primary sidelink device, and UEs 340 and 342 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 340 and 342 may optionally communicate directly with one another in addition to communicating with the scheduling entity 338. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 300, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 300 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 324 (illustrated as a vehicle, although any suitable form of UE may be used) may move from the geographic area corresponding to its serving cell 302 to the geographic area corresponding to a neighbor cell 306. When the signal strength or quality from the neighbor cell 306 exceeds that of its serving cell 302 for a given amount of time, the UE 324 may transmit a reporting message to its serving base station 310 indicating this condition. In response, the UE 324 may receive a handover command, and the UE may undergo a handover to the cell 306.

In a network configured for UL-based mobility, UL reference signals from each UE may be utilized by the network to select a serving cell for each UE. In some examples, the base stations 310, 312, and 314/216 may broadcast unified synchronization signals (e.g., unified Primary Synchronization Signals (PSSs), unified Secondary Synchronization Signals (SSSs) and unified Physical Broadcast Channels (PBCH)). The UEs 322, 324, 326, 328, 330, and 332 may receive the unified synchronization signals, derive the carrier frequency and slot timing from the synchronization signals, and in response to deriving timing, transmit an uplink pilot or reference signal. The uplink pilot signal transmitted by a UE (e.g., UE 324) may be concurrently received by two or more cells (e.g., base stations 310 and 314/216) within the radio access network 300. Each of the cells may measure a strength of the pilot signal, and the radio access network (e.g., one or more of the base stations 310 and 314/216 and/or a central node within the core network) may determine a serving cell for the UE 324. As the UE 324 moves through the radio access network 300, the network may continue to monitor the uplink pilot signal transmitted by the UE 324. When the signal strength or quality of the pilot signal measured by a neighboring cell exceeds that of the signal strength or quality measured by the serving cell, the network 300 may handover the UE 324 from the serving cell to the neighboring cell, with or without informing the UE 324.

Although the synchronization signal transmitted by the base stations 310, 312, and 314/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 300 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 4:
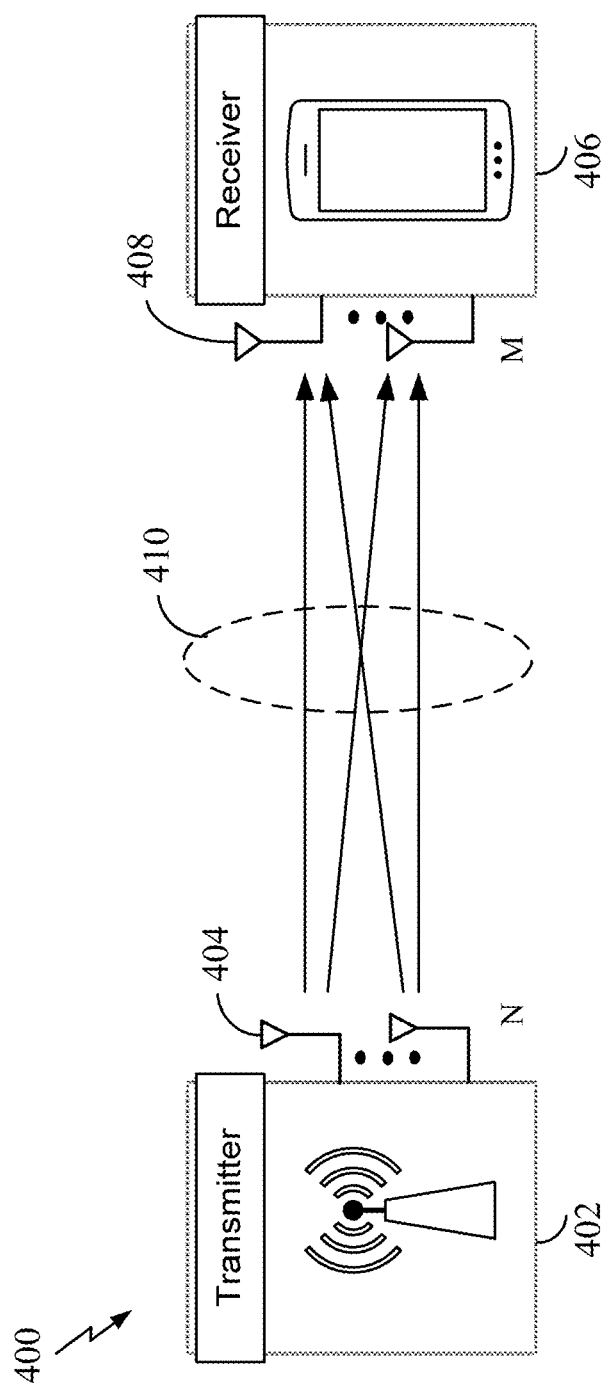
FIG. 4 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 4 illustrates an example of a wireless communication system 400 supporting MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the channel quality indicator (CQI) and RI values to the base station for use in updating the rank and assigning REs for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

A UE may communicate with a service network using a subscription for a service (e.g., data service, voice service) provided by the service network. The UE may implement a subscription module such as a subscriber identity module (SIM) to connect to the service network. A UE may be configured to communicate using two or more subscriptions.

For example, a UE implementing multiple SIMs respectively associated with multiple subscriptions may communicate using the multiple subscriptions via the multiple SIMs. The UE may establish communication links using the multiple subscriptions to perform communication using the multiple subscriptions. The communication links may be established with a common base station. For example, for a UE with two SIMs having a dual SIM, dual active (DSDA) capability, two SIMs may stay connected (or active) simultaneously with a network and thus may be used to perform communication simultaneously. In another example, for a UE with two SIMs having a dual SIM, dual standby (DSDS) capability, while one SIM is used to actively perform communication, the other SIM is placed on standby.

In a case where the UE connects with the same base station using multiple subscriptions, different ways to schedule data communication may be explored. If the UE establishes multiple connections using multiple subscriptions over a common communication link, the common communication link may be shared by data traffic via the multiple connections using the multiple subscriptions. However, an effective approach to schedule data communication when a common communication link is used by multiple subscriptions for multiple connections has not been developed.

According to an aspect of the disclosure, a UE may establish multiple connections with a base station using multiple subscriptions (e.g., associated with multiple SIMS) via a single communication link and may receive scheduling information (e.g., uplink scheduling grant or downlink scheduling assignment) for data communication and a subscription indicator indicating one or more subscriptions to be used for the data communication over the single communication. For example, the single communication link may be a communication link that is common for the multiple subscription. Further, the UE may schedule/perform the data communication over the single communication link based on the scheduling information and the one or more subscriptions indicated by the subscription indicator. In an aspect, if the scheduling information includes an uplink scheduling grant, the UE may schedule/transmit the data communication based on the uplink scheduling grant using the first subscription and/or the second subscription indicated by the subscription indicator. In an aspect, if the scheduling information includes a downlink scheduling assignment, the UE may receive the data communication based on the downlink scheduling assignment using the first subscription and/or the second subscription indicated by the subscription indicator. The multiple connections over the single communication link between the UE and the base stations may be radio resource control (RRC) connections.

In an aspect, a first subscription used to establish a first connection via the single communication link may be used to perform a random access channel (RACH) procedure and an RRC setup procedure. To establish each subsequent connection via the single communication link using a respective subscription after establishing the first connection (e.g., while the first connection is active), a corresponding RRC setup procedure is performed but a RACH procedure may not be performed. Because no RACH procedure may be performed for establishing any subsequent connection after establishing the first connection, a latency associated with the subsequent connection establishment is reduced. The RRC setup procedure may also be referred to as an RRC connection establishment procedure. In an aspect, lower layers in a protocol stack of a UE such as a media access control (MAC) layer and a physical layer (PHY) of the UE may be shared by the multiple subscriptions, while each of the multiple subscriptions may utilize its own layers for the other layers in the protocol stack of the UE. In an aspect, lower layers in a protocol stack of a base station such as a MAC layer and a physical layer (PHY) of the base station may be shared by the multiple subscriptions, while each of the multiple subscriptions may utilize its own layers for the other layers in the protocol stack of the base station.

In an aspect, each of the subscriptions may be associated with its own security instances for communication. For example, a packet data convergence protocol (PDCP) layer for signaling radio bearers (SRBs) and dedicated radio bearers (DRBs) for a particular subscription may have a security key for the particular subscription at an access stratum (AS). In an aspect, the connections using the multiple subscriptions via a single communication link may be established in any order. For example, one connection using the first subscription via a communication link may be established either before or after establishing another connection using the first subscription via the communication link. In an aspect, a connection via a single communication link using one subscription may become idle without interrupting another connection via the single communication link using another subscription, regardless of which connection was established first. For example, if a first RRC connection associated with a first subscription (e.g., via the first SIM) becomes idle, RRC signaling using a second RRC connection associated with a second subscription (e.g., via the second SIM) continues without interruption, regardless of whether the first RRC connection is established first or the second RRC connection is established first. In an aspect, for each of the subscriptions, a serving temporary mobile subscriber identity (S-TMSI) may be assigned to the NAS instances and may not be associated with the same AMF instance as other subscriptions.

Figure 5:
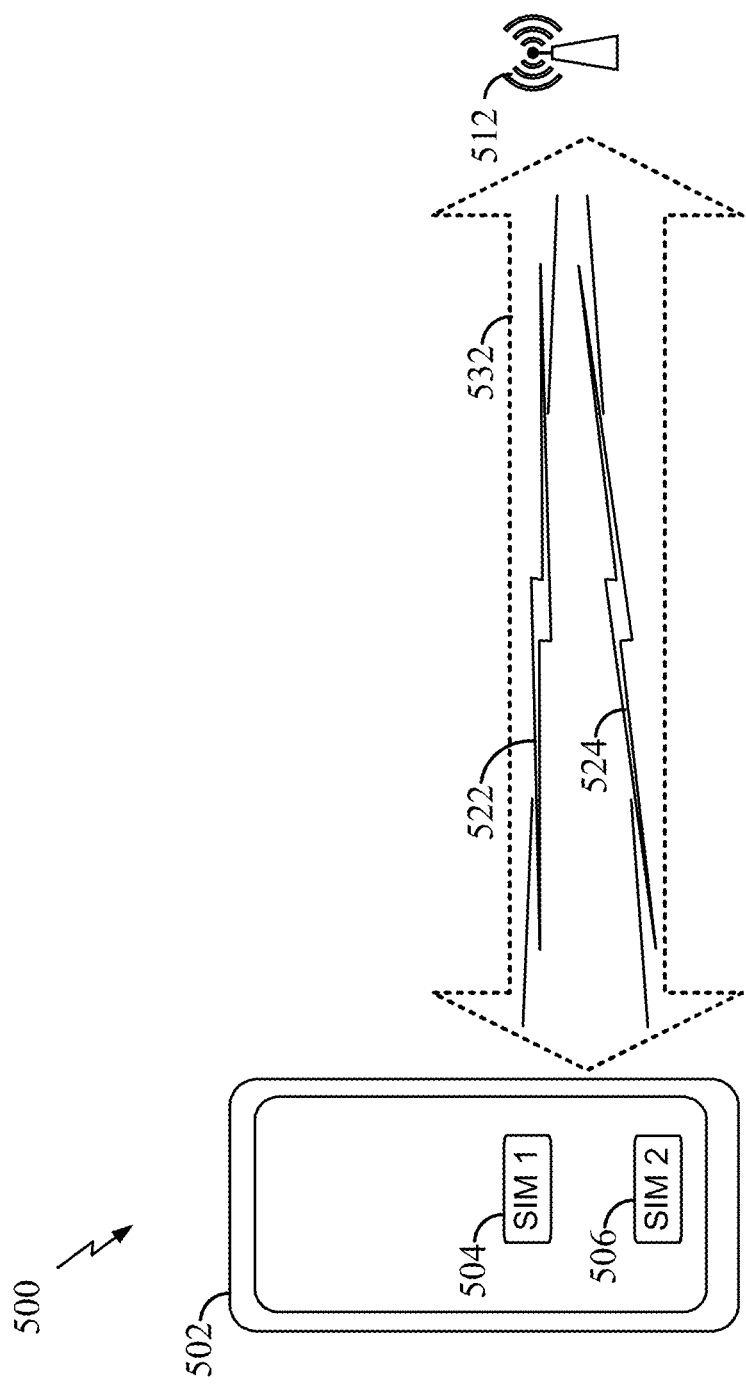
FIG. 5 is an example diagram illustrating connections between a user equipment (UE) and a base station via a single communication link using multiple subscriptions, according to an aspect of the disclosure.

FIG. 5 is an example diagram 500 illustrating connections between a user equipment and a base station via a single communication link using multiple subscriptions. In FIG. 5, a UE 502 includes two SIMs, a first SIM 504 associated with a first subscription and a second SIM 506 associated with a second subscription. For illustrative purposes, a dual SIM case with the first SIM 504 and the second SIM 506 is shown and explained. However, it is understood that the disclosure is not limited to a UE with two SIMs, and more than two SIMs for more than two subscriptions may be used. In FIG. 5, the UE 502 utilizes the first SIM 504 to establish a first connection 522 via a communication link 532 with a base station 512 using the first subscription. The UE 502 also utilizes the second SIM 506 to establish a second connection 524 via the communication link 532 with the base station 512 using the second subscription.

As discussed above, either the first connection 522 or the second connection 524 may be established first. For example, if the first connection 522 is established first, the UE 502 may establish the first connection 522 by performing a RACH procedure and a first RRC setup procedure with the base station 512 using the first SIM 504 associated with the first subscription, and then may establish the second connection 524 by performing a second RRC setup procedure with the base station 512 using the second SIM 506 associated with the second subscription. In this example, when establishing the second connection 524, a RACH procedure may not be performed, at least because the communication link 532 is common for both the first and second subscriptions and the RACH procedure is already performed when establishing the first connection 522 using the first SIM 504.

In an aspect, RRC signaling for each of the multiple subscriptions may be performed separately over a respective RRC connection. For example, the first SIM 504 may be used to perform RRC signaling via the first connection 522 over the communication link 532, and the second SIM 506 may be used to perform RRC signaling via the second connection 524 over the communication link 534. In an aspect, a separate SRB may be set up for each SIM. For example, security for the RRC signaling for each SIM may be derived from a corresponding NAS security. In another aspect, a primary RRC connection and a secondary RRC connection may be established between the UE 502 and the base station 512, and a primary RRC connection may be used for RRC signaling for both the first SIM 504 and the second SIM 506.

Figure 6:
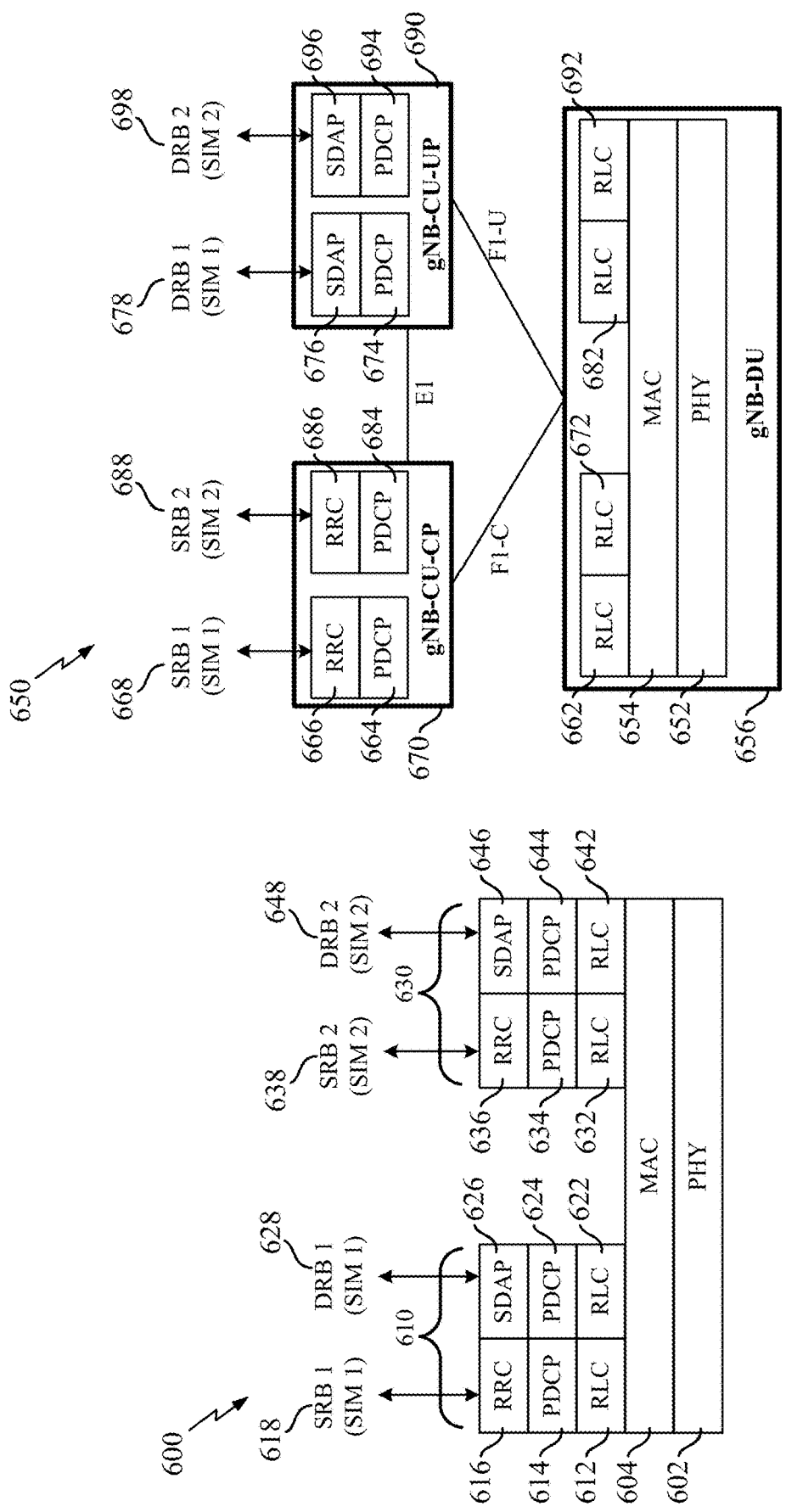
FIGS. 6A and 6B are example diagrams illustrating protocol stacks of a UE and a base station, where two connections using two subscriptions via a single communication link are established between the UE and the base station, according to an aspect of the disclosure.

FIGS. 6A and 6B are example diagrams illustrating protocol stacks of a UE and a base station, where two connections using two subscriptions via a single communication link are established between the UE and the base station, according to an aspect of the disclosure. FIG. 6A is an example diagram 600 illustrating a protocol stack of the UE, according to an aspect of the disclosure. As shown in FIG. 6A, the protocol stack of the UE (e.g., UE 502) includes a PHY layer 602 and a MAC layer 604 shared by a first SIM/first subscription and a second SIM/second subscription. Thus, the first SIM/first subscription may utilize the PHY layer 602 and the MAC layer 604 to perform a first communication over the communication link, and the second SIM/second subscription may also utilize the PHY layer 602 and the MAC layer 604 to perform a second communication over the communication link Above the MAC layer 604, the protocol stack of the UE also includes first upper layers 610 utilized by the first SIM/first subscription and second upper layers 630 utilized by the second SIM/second subscriptions. Hence, layers above the MAC layer 604 in the UE's protocol stack are not shared by the first SIM/first subscription and the second SIM/second subscription, but instead include the first upper layers 610 utilized by the first SIM/first subscription to perform the first communication over the communication link and the second upper layers 630 utilized by the second SIM/second subscription to perform the second communication over the communication link.

In FIG. 6A, the first upper layers 610 may include a first set of the first upper layers 610 for a first SRB 618 and a second set of the first upper layers 610 for a first DRB 628, where the first SRB 618 and the first DRB 628 are utilized by the first SIM/first subscription. In particular, the first set of the first upper layers 610 for the first SRB 618 may include a first radio link control (RLC) layer 612 of the first upper layers 610, a first PDCP layer 614 of the first upper layers 610, and a first RRC layer 616. The second set of the first upper layers 610 for the first DRB 628 may include a second RLC layer 622 of the first upper layers 610, a second PDCP layer 624 of the first upper layers 610, and a first service data adaptation protocol (SDAP) layer 626.

In FIG. 6A, the second upper layers 630 may include a first set of the second upper layers 630 for a second SRB 638 and a second set of second upper layers 630 for a second DRB 648, where the second SRB 638 and the second DRB 648 are utilized by the second SIM/second subscription. In particular, the first set of the second upper layers 630 for the second SRB 638 may include a first RLC layer 632 of the second upper layers 630, a first PDCP layer 634 of the second upper layers 630, and a second RRC layer 636. The second set of the second upper layers 630 for the second DRB 648 may include a second RLC layer 642 of the second upper layers 630, a second PDCP layer 644 of the second upper layers 630, and a second SDAP layer 646.

FIG. 6B is an example diagram 650 illustrating a protocol stack of the base station, according to an aspect of the disclosure. The base station may be a gNB including a gNB distributed unit (gNB-DU) 656, a gNB centralized unit control plane (a gNB-CU-CP) 670, and a gNB centralized unit user plane (gNB-CU-UP) 690. The gNB-DU 656 may communicate with the gNB-CU-CP 670 for SRBs via an F1-C interface and may communicate with the gNB-CU-UP 690 for DRBs via an F1-U interface. The gNB-CU-CP 670 for SRBs and the gNB-CU-UP 690 for DRBs may communicate with each other via an E1 interface. The protocol stack of the base station may include a PHY layer 652 and a MAC layer 654 that are shared by the first SIM/first subscription and the second SIM/second subscription. Thus, the first SIM/first subscription may rely on the PHY layer 652 and the MAC layer 654 to perform a first communication over the communication link, and the second SIM/second subscription may also rely on the PHY layer 652 and the MAC layer 654 to perform a second communication over the communication link Above the MAC layer 654, the protocol stack of the base station also includes first upper layers utilized by the first SIM/first subscription to perform the first communication over the communication link and second upper layers utilized by the second SIM/second subscriptions to perform the second communication over the communication link, where the first layers and the second upper layers are not shared by the first SIM/first subscription and the second SIM/second subscription.

In FIG. 6B, the first upper layers in the protocol stack of the base station may include a first set of the first upper layers for a first SRB 668 and a second set of second upper layers a first DRB 678. The first SRB 668 and the first DRB 678 may respectively be equivalent to the first SRB 618 and the first DRB 628 utilized by the first SIM/first subscription. In particular, the first set of the first upper layers for the first SRB 668 may include a first RLC layer 662 of the first upper layers, a first PDCP layer 664 of the first upper layers, and a first RRC layer 666. The second set of the first upper layers for the first DRB 678 may include a second RLC layer 672 of the first upper layers, a second PDCP layer 674 of the first upper layers, and a first SDAP layer 676.

In FIG. 6B, the second upper layers in the protocol stack of the base station may include a first set of the second upper layers for a second SRB 688 and a second set of second upper layers for a second DRB 698, where the second SRB 688 and the second DRB 698 are utilized by the second SIM/second subscription. In particular, the first set of the second upper layers for the second SRB 688 may include a first RLC layer 682 of the second upper layers, a first PDCP layer 684 of the second upper layers, and a second RRC layer 686. The second set of the second upper layers for the second DRB 698 may include a second RLC layer 692 of the second upper layers, a second PDCP layer 694 of the second upper layers, and a second SDAP layer 696. The second SRB 688 and the second DRB 698 may respectively be equivalent to the second SRB 638 and the second DRB 648 utilized by the second SIM/second subscription.

As shown in FIG. 6B, the gNB-DU 656 may include the PHY layer 652, the MAC layer 654, the first RLC layer 662 of the first upper layers, the second RLC layer 672 of the first upper layers, the first RLC layer 682 of the second upper layers, and the second RLC layer 692 of the second upper layers. The gNB-CU-CP 670 for SRBs may include the first PDCP layer 664 of the first upper layers and the first RRC layer 666 associated with the first SRB 668 and may further include the first PDCP layer 684 of the second upper layers and the second RRC layer 686 associated with the second SRB 688. The gNB-CU-UP 690 for DRBs may include the second PDCP layer 674 of the first upper layers and the first SDAP layer 676 associated with the first DRB 678, and may further include the second PDCP layer 694 of the second upper layers and the second SDAP layer 696 associated with the second DRB 698.

At least one of the following approaches may be used for scheduling the data communication over the communication link According to a first approach, the data communication using the multiple subscriptions may be scheduled separately. Hence, for example, in the first approach, when the UE receives scheduling information such as a downlink assignment or an uplink grant (e.g., via DCI), the scheduling information may be for data communication using one of the multiple subscriptions. On the other hand, according to a second approach, the data communication using the multiple subscription may be scheduled for data communication using two or more subscriptions of the multiple subscriptions. For example, in the second approach, when the UE receives scheduling information such as a downlink assignment or an uplink grant (e.g., via DCI), the scheduling information may be for data communication using two or more of the multiple subscriptions.

In the first approach, the per-subscription scheduling may be performed according to one or more of the following options. According to a first option of the first approach, the subscription indicator may be a C-RNTI, where a different respective C-RNTI may be assigned to each subscription of the multiple subscriptions. In an aspect, in a case with at least two SIMs (e.g., in FIG. 5), a first C-RNTI may be assigned to a first SIM/first subscription, and a second C-RNTI may be assigned to a second SIM/second subscription. In an aspect, the first C-RNTI may be assigned to the first SIM/first subscription (e.g., by the base station) while establishing the first connection between the UE and the base station using the first subscription via the communication link. In an aspect, the second C-RNTI may be assigned to the second SIM/second subscription (e.g., by the base station) while establishing the second connection between the UE and the base station using the second subscription via the communication link After the first and second connections have been established, when the UE receive the scheduling information for the data communication, the scheduling information may include a C-RNTI that is either the first C-RNTI to indicate the first subscription for the data communication or the second C-RNTI to indicate the second subscription for the data communication. Hence, if the scheduling information includes the first C-RNTI, the UE performs the data communication using the first SIM/first subscription, and if the scheduling information includes the second C-RNTI, the UE performs the data communication using the second SIM/second subscription. In an aspect, the scheduling information may be carried in DCI of a PDCCH that includes the scheduling information scrambled with the C-RNTI.

According to a second option of the first approach, the subscription indicator may be a logical channel group (LCG) for the data communication, where a different respective LCG may be configured for each subscription of the multiple subscriptions. In an aspect, in a case with at least two SIMs (e.g., in FIG. 5), a first LCG may be configured for a first SIM/first subscription, and a second LCG may be configured for a second SIM/second subscription. In an aspect, the first LCG may be configured for the first SIM/first subscription (e.g., by the base station) while establishing the first connection between the UE and the base station using the first subscription via the communication link. In an aspect, the second LCG may be configured for the second SIM/second subscription (e.g., by the base station) while establishing the second connection between the UE and the base station using the second subscription via the communication link. For example, while establishing the first connection, the base station may transmit a first RRC reconfiguration message indicating that the first LCG is associated with the first subscription. For example, while establishing the second connection, the base station may transmit a second RRC reconfiguration message indicating that the second LCG is associated with the second subscription.

After the first and second connections have been established, when the UE receives the scheduling information for the data communication, the scheduling information may include the subscription indicator that indicates either the first LCG to indicate the first subscription for the data communication or the second LCG to indicate the second subscription for the data communication. Hence, if the subscription indicator in the scheduling information indicates the first LCG, the UE performs the data communication using the first SIM/first subscription, and if the subscription indicator in the scheduling information indicates the second LCG, the UE performs the data communication using the second SIM/second subscription. In an aspect, the scheduling information and the subscription indicator may be carried in DCI of a PDCCH.

According to a third option of the first approach, a different subscription identifier (e.g., SIM index) may be assigned to each subscription of the multiple subscriptions. In an aspect, in a case with at least two SIMs (e.g., in FIG. 5), a first C-RNTI may be assigned to a first SIM/first subscription, and a second C-RNTI may be assigned to a second SIM/second subscription. In an aspect, the first subscription indicator may be assigned to the first SIM/first subscription (e.g., by the base station) while establishing the first connection between the UE and the base station using the first subscription via the communication link. In an aspect, the second subscription indicator may be assigned to the second SIM/second subscription (e.g., by the base station) while establishing the second connection between the UE and the base station using the second subscription via the communication link. For example, while establishing the first connection, the base station may transmit a first RRC reconfiguration message with the first subscription indicator to indicate that the first subscription indicator is associated with the first subscription. For example, while establishing the second connection, the base station may transmit a second RRC reconfiguration message with the second subscription indicator to indicate that the second subscription indicator is associated with the second subscription. Hence, after the connections are established via the communication link respectively using multiple subscriptions, the UE and/or the base station may have a set of subscription indicators respectively associated with the multiple subscriptions that may be used for the data communication.

After the first and second connections have been established, the UE may receive the scheduling information for the data communication, where the scheduling information may include a subscription indicator that indicates a particular subscription of multiple subscriptions used by the UE. For example, the scheduling information may include either the first subscription indicator to indicate the first subscription for the data communication or the second subscription indicator to indicate the second subscription for the data communication. Hence, if the scheduling information includes the first subscription indicator, the UE performs the data communication using the first SIM/first subscription, and if the scheduling information includes the second subscription indicator, the UE performs the data communication using the second SIM/second subscription. In an aspect, the scheduling information and the subscription indicator may be carried in DCI of a PDCCH.

In the second approach, the subscription indicator may indicate a particular LCG(s) of a set of LCGs for the data communication, where each LCG of the set of LCGs may be configured for one or more subscriptions. In an aspect, in a case with at least two SIMs (e.g., in FIG. 5), while establishing the first connection and the second connection between the UE and the base station via the communication link respectively using the first subscription and the second subscription, the base station may transmit a list of multiple LCGs to the UE. For example, one or more first LCGs may be configured for the first SIM/first subscription (e.g., by the base station) while establishing the first connection between the UE and the base station using the first subscription via the communication link. In this example, after establishing the first connection, one or more second LCGs may be configured for the second SIM/second subscription (e.g., by the base station) and one or more third LCGs may be configured for both the first SIM/first subscription and second SIM/second subscription while establishing the second connection between the UE and the base station using the second subscription via the communication link Hence, in this example, the set of LCGs received at the UE may include the one or more first LCGs, the one or more second LCGs, and the one or more third LCGs. In an example, while establishing the first connection, the base station may transmit a first RRC reconfiguration message indicating that the one or more first LCGs is associated with the first subscription. In this example, while establishing the second connection, the base station may transmit a second RRC reconfiguration message indicating that the one or more second LCGs is associated with the second subscription and that the one or more third LCG is associated with both the first subscription and the second subscription.

After the first and second connections have been established, when the UE receive the scheduling information for the data communication, the scheduling information may include the subscription indicator that indicates a particular LCG(s) of the set of LCGs (e.g., including the one or more first LCGs, the one or more second LCGs, and the one or more third LCGs). Hence, if the subscription indicator in the scheduling information indicates the one or more first LCGs, the UE performs the data communication using the first SIM/first subscription, and if the subscription indicator in the scheduling information indicates the one or more second LCGs, the UE performs the data communication using the second SIM/second subscription. If the subscription indicator in the scheduling information indicates the one or more third LCGs, the UE performs the data communication using the first SIM/first subscription and the second SIM/second subscription. In an aspect, the scheduling information and the subscription indicator may be carried in DCI of a PDCCH. The subscription indicator may indicate the LCG via a bitmap or an LCG identifier associated with the LCG.

Figure 7:
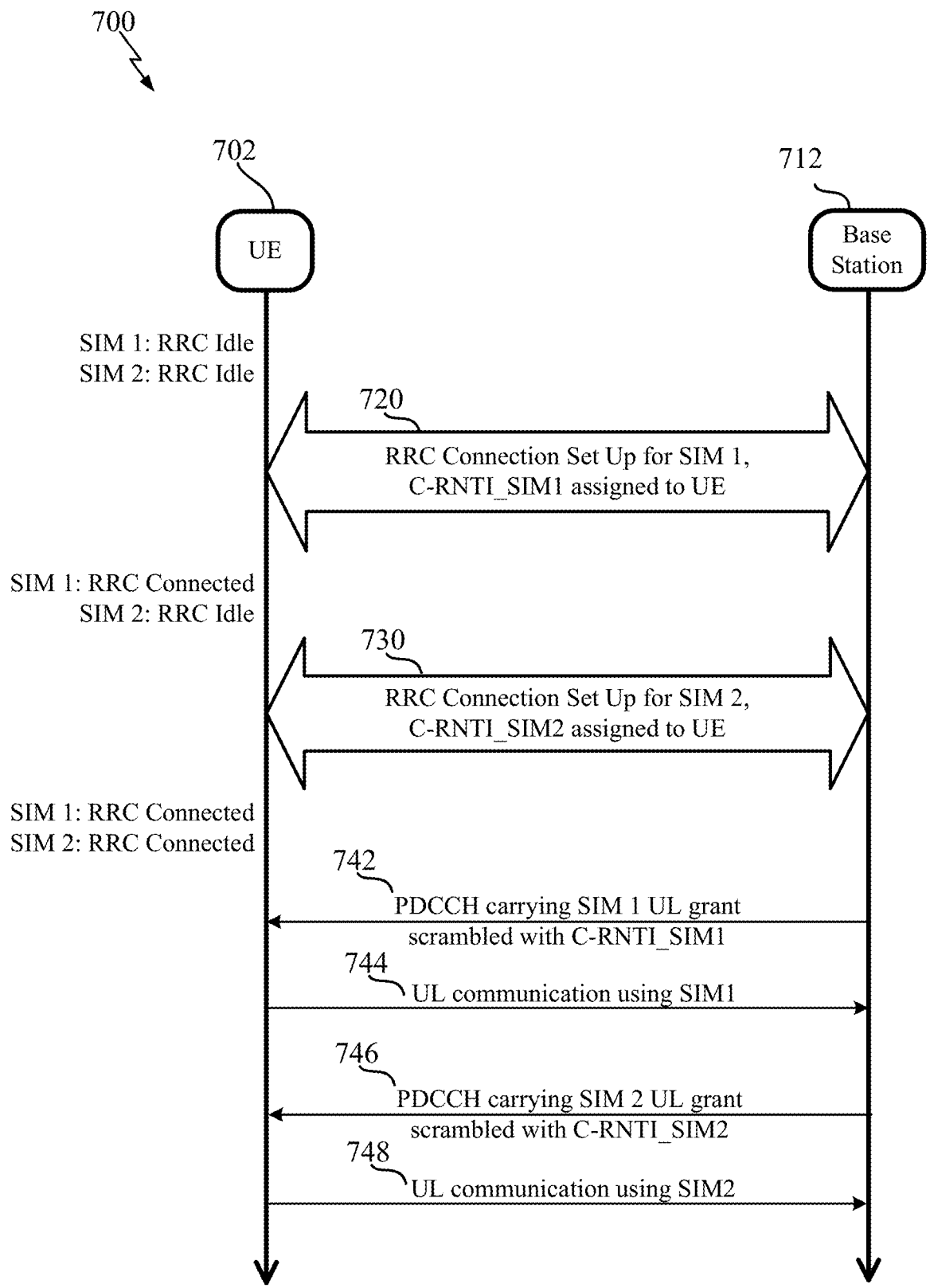
FIG. 7 is a flow diagram illustrating a process to schedule data communication between a UE and a base station over a communication link via which two connections using two different subscriptions are established, in a first option of a first approach, according to an aspect of the disclosure.

FIG. 7 is a flow diagram 700 illustrating a process to schedule data communication between a UE and a base station over a communication link via which two connections using two different subscriptions are established, in the first option of the first approach, according to an aspect of the disclosure. The process in FIG. 7 may be performed using a UE 702 having a first SIM (SIM 1) associated with a first subscription and a second SIM (SIM 2) associated with a second subscription, and a base station 712.

At 720, the UE 702 and the base station 712 performs a first RRC connection establishment procedure to establish a first connection using the first SIM/first subscription via the communication link During the first RRC connection establishment procedure at 720, a first C-RNTI (e.g., C-RNTI_SIM1) may be assigned to the UE 702 for the first SIM/first subscription. Prior to 720, the status of the first SIM may be an idle mode and the status of the second SIM may also be an idle mode. After the first RRC connection establishment procedure is performed at 720, the status of the first SIM may become a connected mode and the status of the second SIM may stay as the idle mode.

At 730, the UE 702 and the base station 712 performs a second RRC connection establishment procedure to establish a second connection using the second SIM/second subscription via the communication link During the second RRC connection establishment procedure at 730, a second C-RNTI (e.g., C-RNTI_SIM2) may be assigned to the UE 702 for the second SIM/second subscription. After the second RRC connection establishment procedure is performed at 730, the status of the first SIM may stay as the connected mode and the status of the second SIM may become a connected mode.

After establishing the first and second connections, the UE 702 may receive DCI of a PDCCH carrying scheduling information (e.g., uplink scheduling grant or downlink scheduling assignment) scrambled with one of the first C-RNTI and the second C-RNTI. For example, at 742, the UE 702 may receive DCI of a PDCCH carrying an uplink scheduling grant scrambled with the first C-RNTI. Subsequently, at 744, the UE 702 performs uplink communication using the first connection and the first SIM/first subscription via the communication link based on the uplink scheduling grant and the first C-RNTI. For example, at 746, the UE 702 may receive DCI of a PDCCH carrying an uplink scheduling grant scrambled with the second C-RNTI. Subsequently, at 748, the UE 702 performs uplink communication using the second connection and the second SIM/second subscription via the communication link based on the uplink scheduling grant and the second C-RNTI. Although the example in FIG. 7 illustrates the DCI of the PDCCH carrying an uplink scheduling grant, it is noted that DCI of a PDCCH in another instance may carry a downlink scheduling assignment scrambled with a particular C-RNTI, which may cause the UE 702 to receive data from the base station 712 using a subscription associated with the particular C-RNTI.

Figure 8:
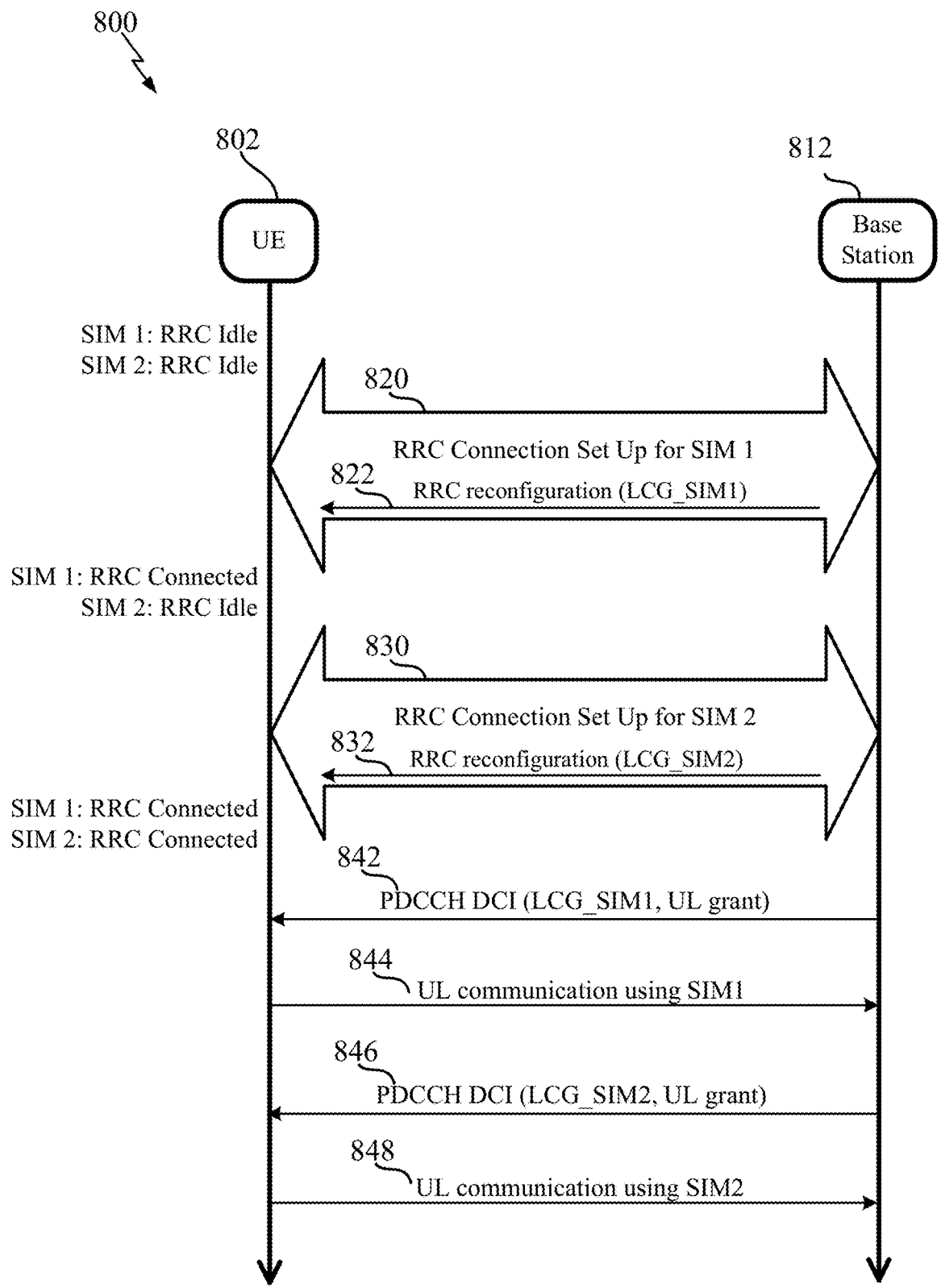
FIG. 8 is a flow diagram illustrating a process to schedule data communication between a UE and a base station over a communication link via which two connections using two different subscriptions are established, in a second option of the first approach, according to an aspect of the disclosure.

FIG. 8 is a flow diagram 800 illustrating a process to schedule data communication between a UE and a base station over a communication link via which two connections using two different subscriptions are established, in the second option of the first approach, according to an aspect of the disclosure. The process in FIG. 8 may be performed using a UE 802 having a first SIM (SIM 1) associated with a first subscription and a second SIM (SIM 2) associated with a second subscription, and a base station 812.

At 820, the UE 802 and the base station 812 performs a first RRC connection establishment procedure to establish a first connection using the first SIM/first subscription via the communication link During the first RRC connection establishment procedure at 820, the base station 812 at 822 may transmit an RRC reconfiguration message indicating that a first LCG (LCG_SIM1) is associated with the first SIM/first subscription. In response to the first RRC reconfiguration message, the UE 802 may configure the first LCG for the first SIM/first subscription. Prior to 820, the status of the first SIM may be an idle mode and the status of the second SIM may also be an idle mode. After the first RRC connection establishment procedure is performed at 820, the status of the first SIM may become a connected mode and the status of the second SIM may stay as the idle mode.

At 830, the UE 802 and the base station 812 performs a second RRC connection establishment procedure to establish a second connection using the second SIM/second subscription via the communication link During the second RRC connection establishment procedure at 830, the base station 812 at 832 may transmit an RRC reconfiguration message indicating that a second LCG (LCG_SIM2) is associated with the second SIM/second subscription. In response to the second RRC reconfiguration message, the UE 802 may configure the second LCG for the second SIM/second subscription. After the second RRC connection establishment procedure is performed at 830, the status of the first SIM may stay as the connected mode and the status of the second SIM may become a connected mode.

After establishing the first and second connections, the UE 802 may receive DCI of a PDCCH carrying scheduling information (e.g., uplink scheduling grant or downlink scheduling assignment) and an subscription indicator indicating one of the first LCG and the second LCG. For example, at 842, the UE 802 may receive DCI of a PDCCH carrying an uplink scheduling grant and a subscription indicator indicating the first LCG associated with the first SIM/first subscription. Subsequently, at 844, the UE 802 performs uplink communication using the first connection and the first SIM/first subscription via the communication link based on the uplink scheduling grant and the subscription indicator indicating the first LCG. For example, at 846, the UE 802 may receive DCI of a PDCCH carrying an uplink scheduling grant and a subscription indicator indicating the second LCG associated with the second SIM/second subscription. Subsequently, at 848, the UE 802 performs uplink communication using the second connection and the second SIM/second subscription via the communication link based on the uplink scheduling grant and the subscription indicator indicating the second LCG. Although the example in FIG. 8 illustrates the DCI of the PDCCH carrying an uplink scheduling grant, it is noted that DCI of a PDCCH in another instance may carry a downlink scheduling assignment, which may cause the UE 802 to receive data from the base station 812 using a subscription based on the subscription indicator.

Figure 9:
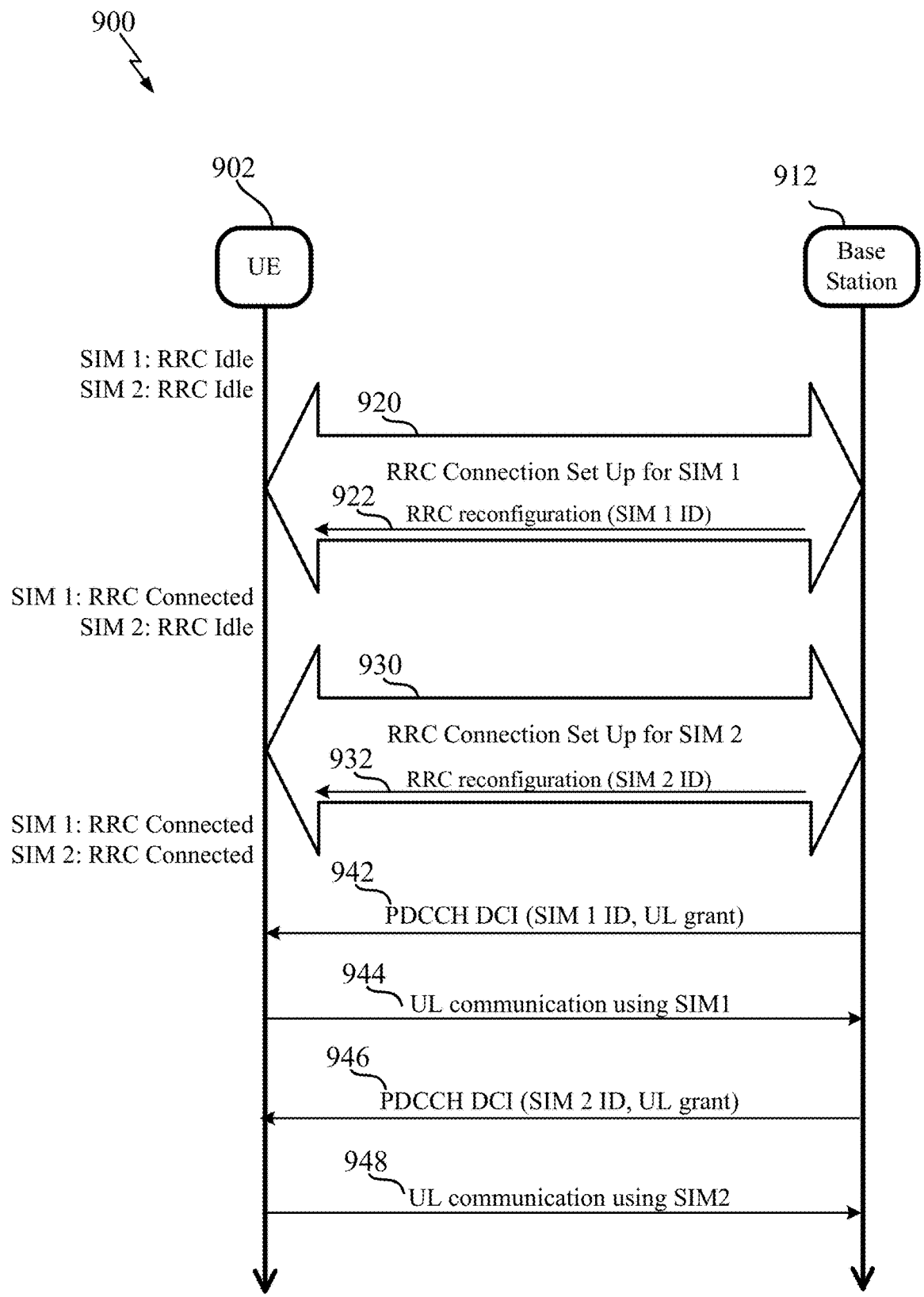
FIG. 9 is a flow diagram illustrating a process to schedule data communication between a UE and a base station over a communication link via which two connections using two different subscriptions are established, in a third option of the first approach, according to an aspect of the disclosure.

FIG. 9 is a flow diagram 900 illustrating a process to schedule data communication between a UE and a base station over a communication link via which two connections using two different subscriptions are established, in the third option of the first approach, according to an aspect of the disclosure. The process in FIG. 9 may be performed using a UE 902 having a first SIM (SIM 1) associated with a first subscription and a second SIM (SIM 2) associated with a second subscription, and a base station 912.

At 920, the UE 902 and the base station 912 performs a first RRC connection establishment procedure to establish a first connection using the first SIM/first subscription via the communication link During the first RRC connection establishment procedure at 920, the base station 912 at 922 may transmit an RRC reconfiguration message with a first subscription indicator to indicate that the first subscription indicator is associated with the first SIM/first subscription. Prior to 920, the status of the first SIM may be an idle mode and the status of the second SIM may also be an idle mode. After the first RRC connection establishment procedure is performed at 920, the status of the first SIM may become a connected mode and the status of the second SIM may stay as the idle mode.

At 930, the UE 902 and the base station 912 performs a second RRC connection establishment procedure to establish a second connection using the second SIM/second subscription via the communication link During the second RRC connection establishment procedure at 930, the base station 912 at 932 may transmit an RRC reconfiguration message having a second subscription indicator to indicate that the second subscription indicator is associated with the second SIM/second subscription. After the second RRC connection establishment procedure is performed at 930, the status of the first SIM may stay as the connected mode and the status of the second SIM may become a connected mode.

After establishing the first and second connections, the UE 902 may receive DCI of a PDCCH carrying scheduling information (e.g., uplink scheduling grant or downlink scheduling assignment) and an subscription indicator indicating one of the first subscription indicator and the second subscription indicator. For example, at 942, the UE 902 may receive DCI of a PDCCH carrying an uplink scheduling grant and a subscription indicator indicating the first subscription indicator associated with the first SIM/first subscription. Subsequently, at 944, the UE 902 performs uplink communication using the first connection and the first SIM/first subscription via the communication link based on the uplink scheduling grant and the first subscription indicator. For example, at 946, the UE 902 may receive DCI of a PDCCH carrying an uplink scheduling grant and a subscription indicator indicating the second subscription indicator associated with the second SIM/second subscription. Subsequently, at 948, the UE 902 performs uplink communication using the second connection and the second SIM/second subscription via the communication link based on the uplink scheduling grant and the second subscription indicator. Although the example in FIG. 9 illustrates the DCI of the PDCCH carrying an uplink scheduling grant, it is noted that DCI of a PDCCH in another instance may carry a downlink scheduling assignment, which may cause the UE 902 to receive data from the base station 912 using a subscription based on the subscription indicator.

Figure 10:
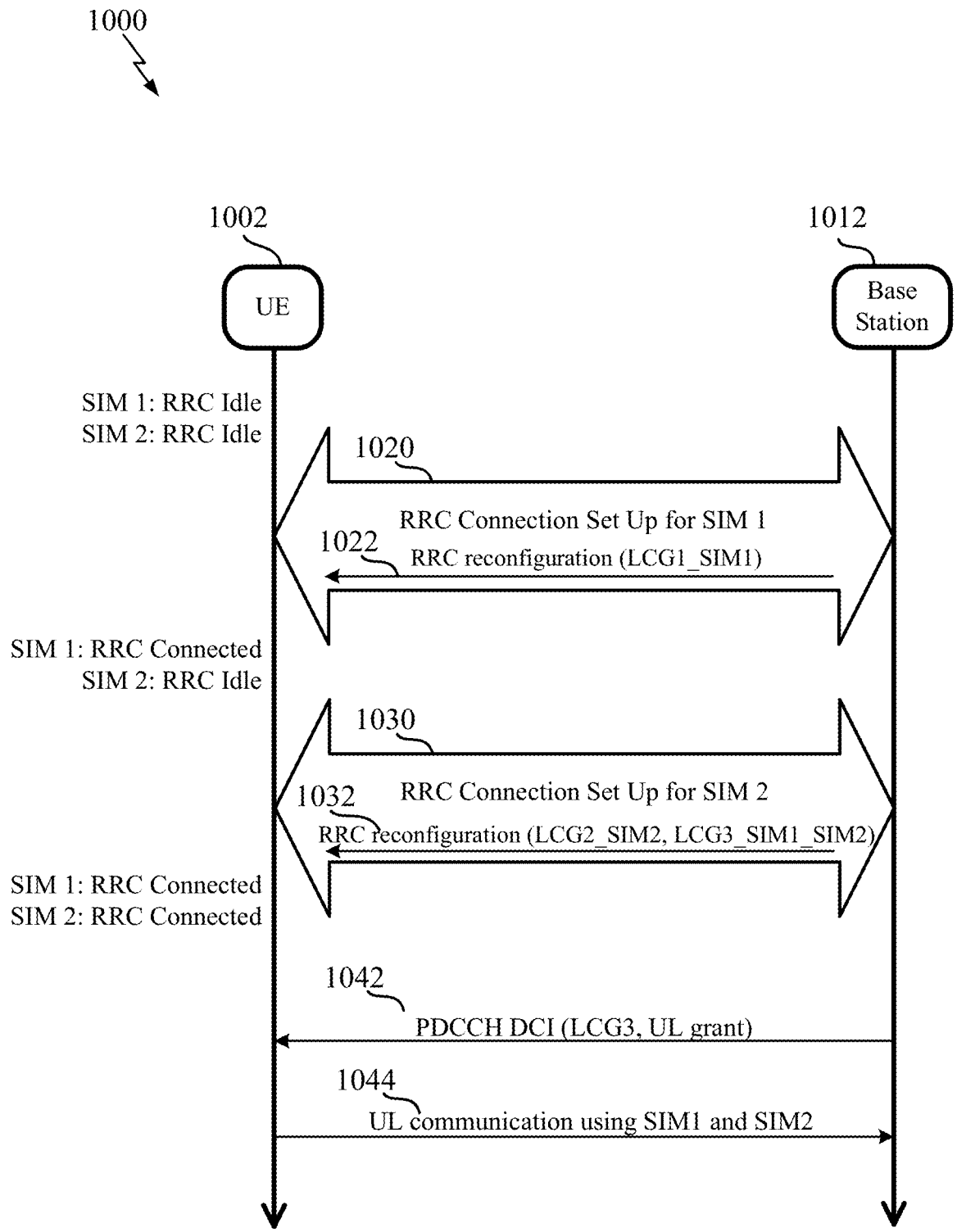
FIG. 10 is a flow diagram illustrating a process to schedule data communication between a UE and a base station over a communication link via which two connections using two different subscriptions are established, in the second approach, according to an aspect of the disclosure.

FIG. 10 is a flow diagram 1000 illustrating a process to schedule data communication between a UE and a base station over a communication link via which two connections using two different subscriptions are established, in the second approach, according to an aspect of the disclosure. The process in FIG. 10 may be performed using a UE 1002 having a first SIM (SIM 1) associated with a first subscription and a second SIM (SIM 2) associated with a second subscription, and a base station 1012.

At 1020, the UE 1002 and the base station 1012 performs a first RRC connection establishment procedure to establish a first connection using the first SIM/first subscription via the communication link During the first RRC connection establishment procedure at 1020, the base station 1012 at 1022 may transmit an RRC reconfiguration message indicating that a first LCG (LCG_SIM1) is associated with the first SIM/first subscription. In response to the first RRC reconfiguration message, the UE 1002 may configure the first LCG for the first SIM/first subscription. Prior to 1020, the status of the first SIM may be an idle mode and the status of the second SIM may also be an idle mode. After the first RRC connection establishment procedure is performed at 1020, the status of the first SIM may become a connected mode and the status of the second SIM may stay as the idle mode.

At 1030, the UE 1002 and the base station 1012 performs a second RRC connection establishment procedure to establish a second connection using the second SIM/second subscription via the communication link During the second RRC connection establishment procedure at 1030, the base station 1012 at 1032 may transmit an RRC reconfiguration message indicating that a second LCG (LCG_SIM2) is associated with the second SIM/second subscription and that a third LCG (LCG_SIM1_SIM2) is associated with both the first SIM/first subscription and the second SIM/second subscription. In response to the second RRC reconfiguration message, the UE 1002 may configure the third LCG for the first SIM/first subscription and the second SIM/second subscription. After the second RRC connection establishment procedure is performed at 1030, the status of the first SIM may stay as the connected mode and the status of the second SIM may become a connected mode.

After establishing the first and second connections, the UE 1002 may receive DCI of a PDCCH carrying scheduling information (e.g., uplink scheduling grant or downlink scheduling assignment) and an subscription indicator indicating one of the first LCG, the second LCG, and the third LCG. For example, at 1042, the UE 1002 may receive DCI of a PDCCH carrying an uplink scheduling grant and a subscription indicator indicating the third LCG associated with the first SIM/first subscription and the second SIM/second subscription. Subsequently, at 1044, the UE 1002 performs uplink communication using the first connection and the first SIM/first subscription and using the second connection and the second SIM/second subscription via the communication link based on the uplink scheduling grant and the subscription indicator. Although the example in FIG. 10 illustrates the DCI of the PDCCH carrying an uplink scheduling grant, it is noted that DCI of a PDCCH in another instance may carry a downlink scheduling assignment, which may cause the UE 1002 to receive data from the base station 1012 using a subscription based on the subscription indicator.

Figure 11:
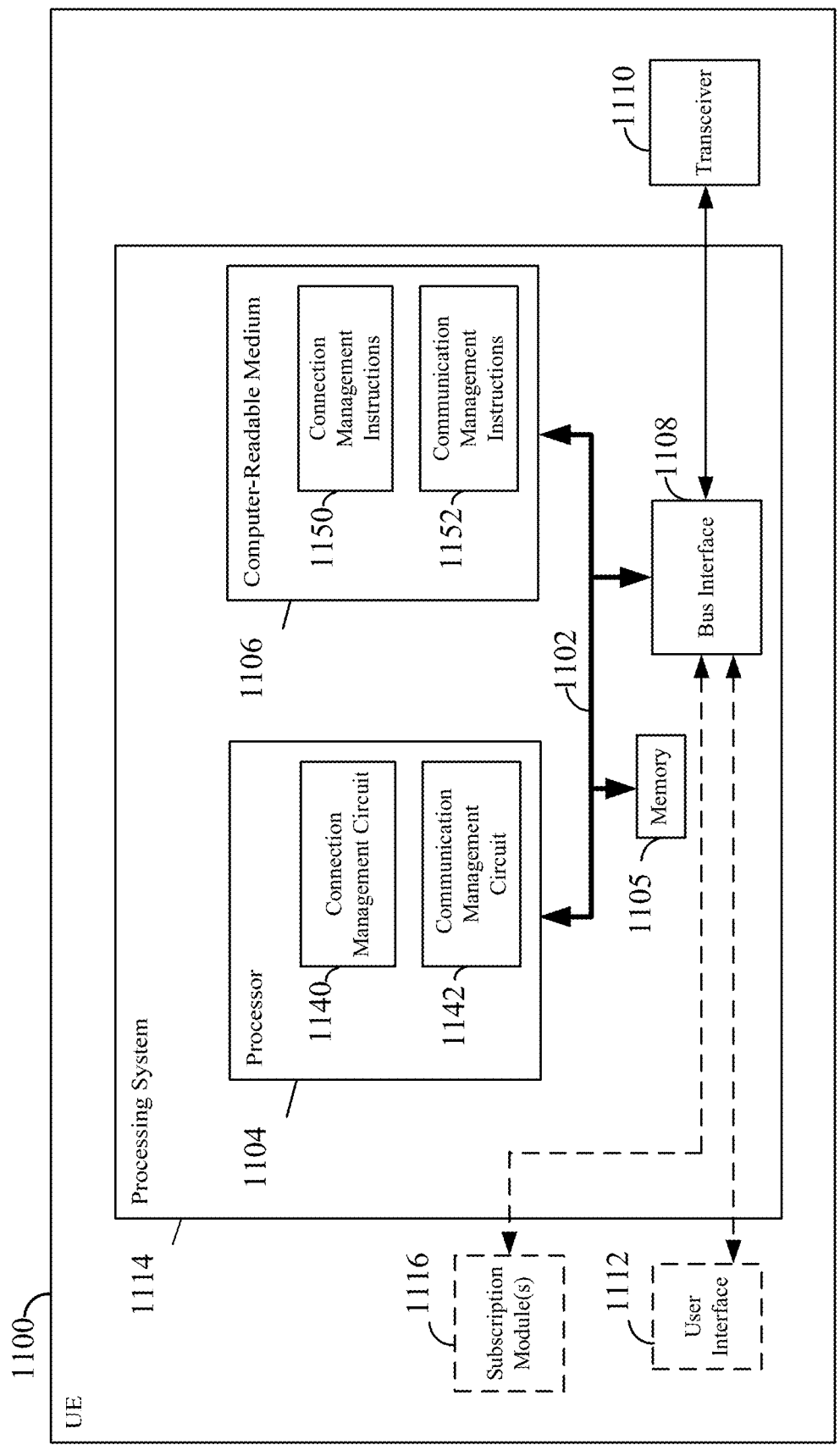
FIG. 11 is a block diagram conceptually illustrating an example of a hardware implementation for a user equipment according to some aspects of the disclosure.

FIG. 11 is a block diagram illustrating an example of a hardware implementation for a UE 1100 employing a processing system 1114. For example, the UE 1100 may be a UE as illustrated in any one or more of FIGS. 1, 2, 3, 5, 6, 7, 8, 9, and/or 10.

The UE 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1100 may be configured to perform any one or more of the functions described herein. That is, the processor 1104, as utilized in a UE 1100, may be used to implement any one or more of the processes and procedures described below and illustrated in FIG. 12.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and processor-readable storage media (represented generally by the processor-readable storage medium 1106).

The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium. In an aspect, the UE 1100 may include a subscription module 1116 that may be used to register with a service network. In such an aspect, the bus interface 1108 may provide an interface between the bus 1102, the transceiver 1110, and the subscription module 1116. In an aspect, the subscription module 1116 may enable the UE 1100 to use multiple subscriptions, such as a first subscription and a second subscription, to provide a service. The subscription module 1116 may include multiple subscription modules respectively for the multiple subscriptions. Depending upon the nature of the apparatus, a user interface 1112 (e.g., keypad, display, speaker, microphone, joystick) may also be provided. Of course, such a user interface 1112 is optional, and may be omitted in some examples, such as a base station.

In some aspects of the disclosure, the processor 1104 may include connection management circuitry 1140 configured for various functions, including, for example, establishing a first connection with a base station via a communication link using a first subscription. For example, the connection management circuitry 1140 may be configured to implement one or more of the functions described below in relation to FIG. 12, including, e.g., block 1202.

In some aspects of the disclosure, the connection management circuitry 1140 may be configured for various functions, including, for example, establishing a second connection with the base station via the communication link using a second subscription. For example, the connection management circuitry 1140 may be configured to implement one or more of the functions described below in relation to FIG. 12, including, e.g., block 1204.

In some aspects of the disclosure, the processor 1104 may include communication management circuitry 1142 configured for various functions, including, for example, receiving, from the base station, scheduling information for data communication, the scheduling information including one of an uplink scheduling grant and a downlink scheduling assignment. For example, the communication management circuitry 1142 may be configured to implement one or more of the functions described below in relation to FIG. 12, including, e.g., block 1206.

In some aspects of the disclosure, the communication management circuitry 1142 may be configured for various functions, including, for example, receiving a subscription indicator indicating at least one of the first subscription or the second subscription to be used for the data communication over the communication link based on the scheduling information. For example, the communication management circuitry 1142 may be configured to implement one or more of the functions described below in relation to FIG. 12, including, e.g., block 1208.

In some aspects of the disclosure, the communication management circuitry 1142 may be configured for various functions, including, for example, scheduling and performing the data communication over the communication link based on the scheduling information using the at least one of the first subscription or the second subscription indicated by the subscription indicator. For example, the communication management circuitry 1142 may be configured to implement one or more of the functions described below in relation to FIG. 12, including, e.g., block 1210.

The processor 1104 is responsible for managing the bus 1102 and general processing, including the execution of software stored on the processor-readable storage medium 1106. The software, when executed by the processor 1104, causes the processing system 1114 to perform the various functions described below for any particular apparatus. The processor-readable storage medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 1106. The processor-readable storage medium 1106 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 1106 may reside in the processing system 1114, external to the processing system 1114, or distributed across multiple entities including the processing system 1114. The processor-readable storage medium 1106 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In some aspects of the disclosure, the processor-readable storage medium 1106 include connection management software/instructions 1150 configured for various functions, including, for example, establishing a first connection with a base station via a communication link using a first subscription. For example, the connection management software/instructions 1150 may be configured to implement one or more of the functions described below in relation to FIG. 12, including, e.g., block 1202.

In some aspects of the disclosure, the connection management software/instructions 1150 may be configured for various functions, including, for example, establishing a second connection with the base station via the communication link using a second subscription. For example, the connection management software/instructions 1150 may be configured to implement one or more of the functions described below in relation to FIG. 12, including, e.g., block 1204.

In some aspects of the disclosure, the processor-readable storage medium 1106 may include communication management software/instructions 1152 configured for various functions, including, for example, receiving, from the base station, scheduling information for data communication, the scheduling information including one of an uplink scheduling grant and a downlink scheduling assignment. For example, the communication management software/instructions 1152 may be configured to implement one or more of the functions described below in relation to FIG. 12, including, e.g., block 1206.

In some aspects of the disclosure, the communication management software/instructions 1152 may be configured for various functions, including, for example, receiving a subscription indicator indicating at least one of the first subscription or the second subscription to be used for the data communication over the communication link based on the scheduling information. For example, the communication management software/instructions 1152 may be configured to implement one or more of the functions described below in relation to FIG. 12, including, e.g., block 1208.

In some aspects of the disclosure, the communication management software/instructions 1152 may be configured for various functions, including, for example, scheduling and performing the data communication over the communication link based on the scheduling information using the at least one of the first subscription or the second subscription indicated by the subscription indicator. For example, the communication management software/instructions 1152 may be configured to implement one or more of the functions described below in relation to FIG. 12, including, e.g., block 1210.

Figure 12:
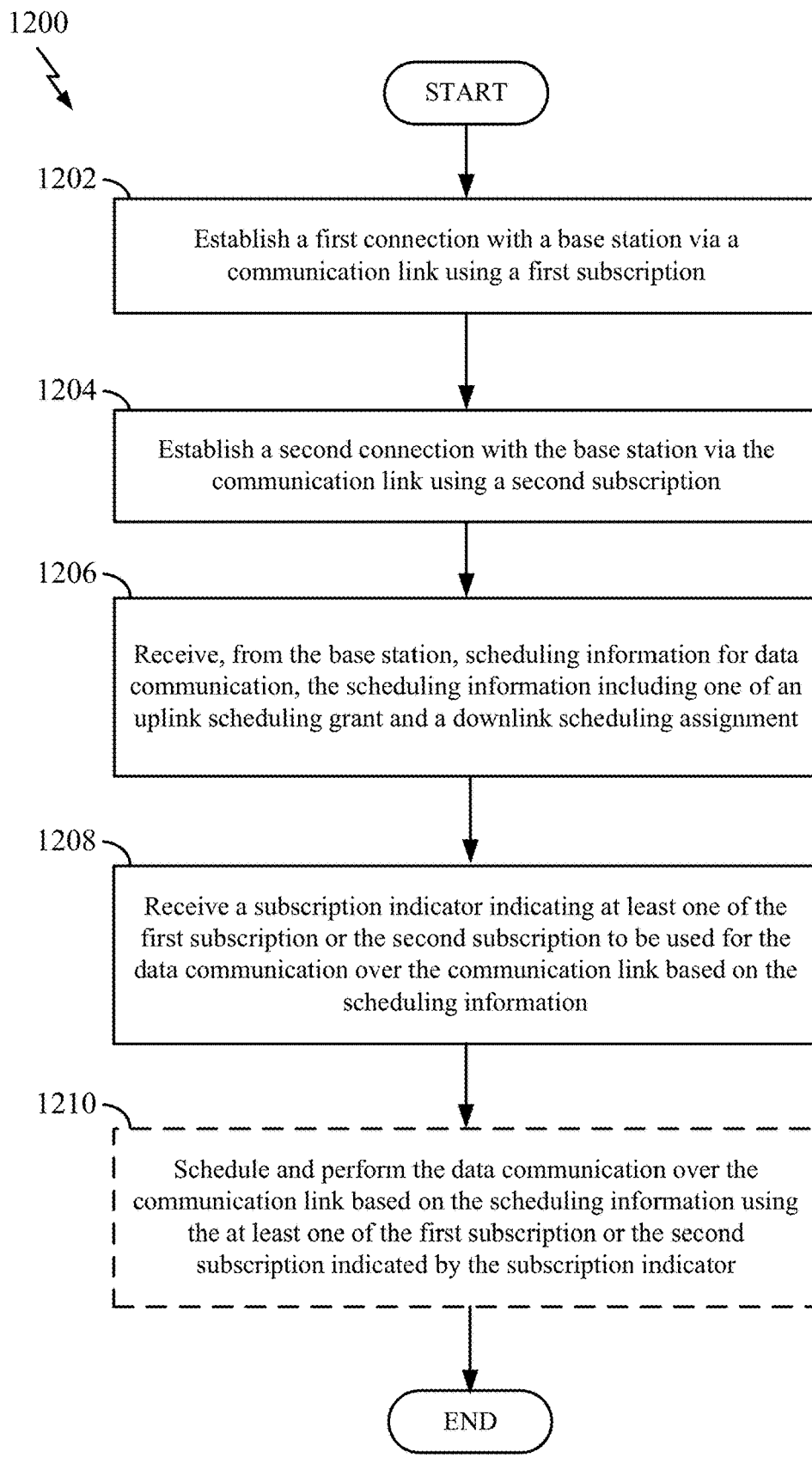
FIG. 12 is a flow chart illustrating an exemplary process for wireless communication by a user equipment, according to some aspects of the disclosure.

FIG. 12 is a flow chart illustrating an exemplary process 1200 for wireless communication by a UE, in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the UE 1100 illustrated in FIG. 11. In some examples, the process 1200 may be carried out by any suitable apparatus or means for carrying out the functions or algorithm described below.

At block 1202, the process 1200 includes establishing a first connection with a base station via a communication link using a first subscription.

At block 1204, the process 1200 includes establishing a second connection with the base station via the communication link using a second subscription. In an aspect, the first connection may be a first RRC connection and the second connection is a second RRC connection.

At block 1206, the process 1200 includes receiving, from the base station, scheduling information for data communication, the scheduling information including one of an uplink scheduling grant and a downlink scheduling assignment.

At block 1208, the process 1200 includes receiving a subscription indicator indicating at least one of the first subscription or the second subscription to be used for the data communication over the communication link based on the scheduling information.

At block 1210, the process 1200 may include scheduling and performing the data communication over the communication link based on the scheduling information using the at least one of the first subscription or the second subscription indicated by the subscription indicator.

In an aspect, the scheduling and performing the data communication at block 1210 may include scheduling and performing uplink communication based on the scheduling information using the at least one of the first subscription or the second subscription indicated by the subscription indicator if the scheduling information includes the uplink scheduling grant, and receiving downlink communication based on the scheduling information using the at least one of the first subscription or the second subscription indicated by the subscription indicator if the scheduling information includes the downlink scheduling assignment.

In an aspect, the subscription indicator may be a C-RNTI, and the C-RNTI may be one of a first C-RNTI to indicate the first subscription for the data communication and a second C-RNTI to indicate the second subscription for the data communication. In an aspect, the establishing the first connection may include assigning the first C-RNTI to the first subscription, and the establishing the second connection may include assigning the second C-RNTI to the second subscription. In an aspect, the scheduling information and the subscription indicator may be received via DCI of a PDCCH including the scheduling information scrambled with the C-RNTI.

In an aspect, the subscription indicator may indicate one of a first subscription indicator to indicate the first subscription for the data communication and a second subscription indicator to indicate the second subscription for the data communication. In an aspect, the establishing the first connection may include receiving a first RRC reconfiguration message including an association between the first subscription indicator and the first subscription, and the establishing the second connection may include receiving a second RRC reconfiguration message including an association between the second subscription indicator and the second subscription. In an aspect, the scheduling information and the subscription indicator may be received via DCI of a PDCCH, and wherein the subscription indicator may be included in a subscription indicator field of the DCI. In an aspect, the first and second subscriptions may be associated with a same C-RNTI.

In an aspect, the subscription indicator may indicate one of the first subscription and the second subscription for the data communication by indicating an LCG associated with the data communication based on the scheduling information, and the LCG may be one of a first LCG to indicate the first subscription for the data communication and a second LCG to indicate the second subscription for the data communication. In an aspect, the establishing the first connection may include receiving a first RRC reconfiguration message including an association between the first LCG and the first subscription, and the establishing the second connection may include receiving a second RRC reconfiguration message including an association between the second LCG and the second subscription. In an aspect, the receiving the scheduling information may include receiving DCI of a PDCCH, the DCI indicating the LCG for which an uplink grant may be provided.

In an aspect, at least one of the establishing the first connection or the establishing the second connection may include receiving a list of a plurality of LCGs, each LCG of the plurality of LCGs being associated with the first subscription, or the second subscription, or both, where the subscription indicator may indicate an LCG of the plurality of LCGs that is associated with the data communication, the LCG being associated with the at least one of the first subscription or the second subscription. In an aspect, the subscription indicator may indicate an LCG of the plurality of LCGs that is associated with the data communication, the LCG being associated with the at least one of the first subscription or the second subscription. In an aspect, subscription indicator may indicate the LCG via a bitmap or an LCG identifier associated with the LCG. In an aspect, the list of the plurality of LCGs may be received via one or more RRC reconfiguration messages. In an aspect, the scheduling information and the subscription indicator may be received via DCI of a PDCCH.

In one configuration, the UE 1100 may include means for establishing a first connection with a base station via a communication link using a first subscription, means for establishing a second connection with the base station via the communication link using a second subscription, means for receiving, from the base station, scheduling information for data communication, the scheduling information including one of an uplink scheduling grant and a downlink scheduling assignment, and means for receiving a subscription indicator indicating at least one of the first subscription or the second subscription to be used for the data communication over the communication link based on the scheduling information. In an aspect, the UE 1100 may further include means for scheduling and performing the data communication over the communication link based on the scheduling information using the at least one of the first subscription or the second subscription indicated by the subscription indicator. In one aspect, the aforementioned means may be the processor(s) 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the processor-readable storage medium 1106, or any other suitable apparatus or means described in any one of the FIGS. 1, 2, 3, 5, 6, 7, 8, 9, and/or 10, and utilizing, for example, the processes and/or algorithms described herein in relation to FIG. 12.

Figure 13:
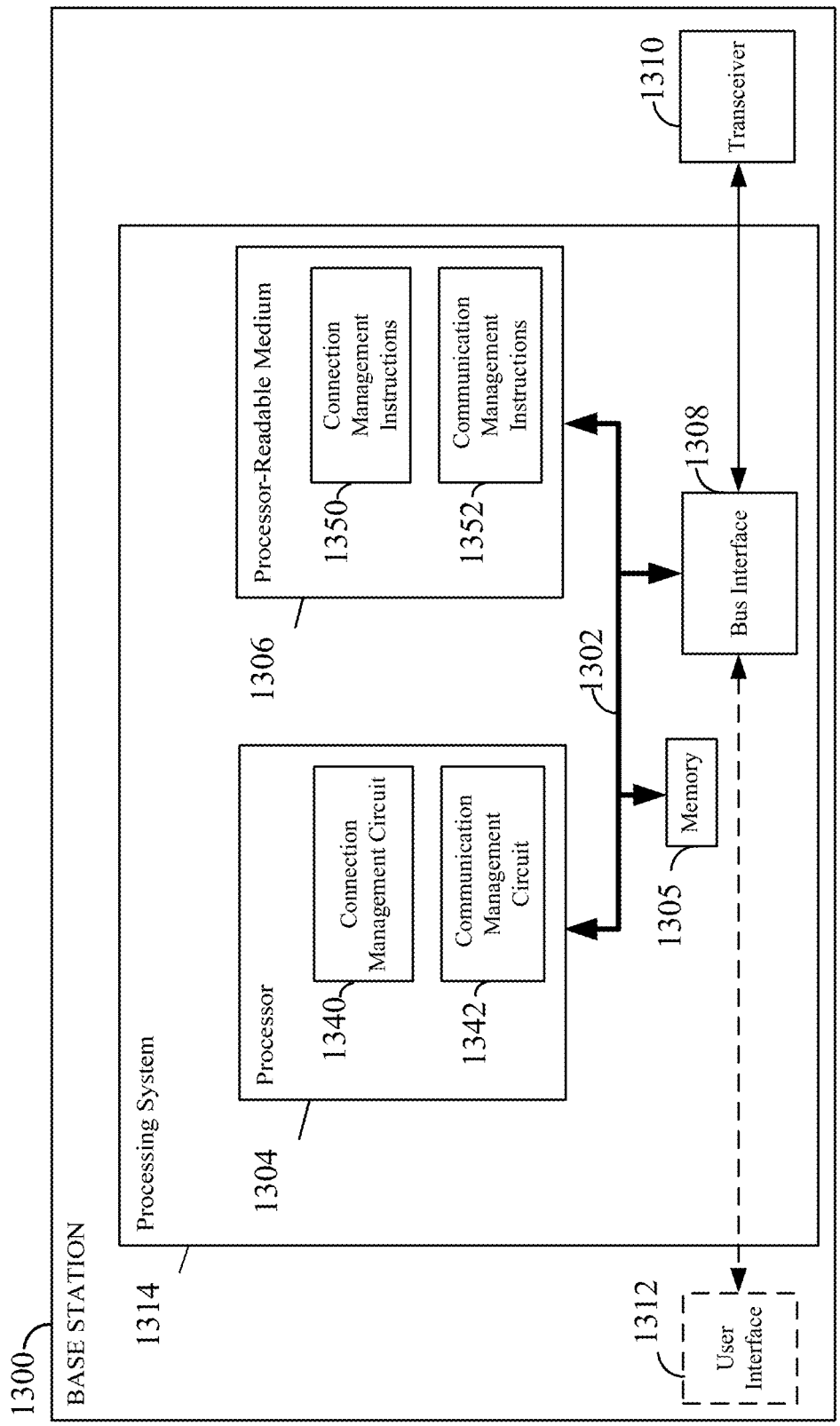
FIG. 13 is a block diagram conceptually illustrating an example of a hardware implementation for a base station according to some aspects of the disclosure.

FIG. 13 is a block diagram illustrating an example of a hardware implementation for a base station 1300 employing a processing system 1314. For example, the base station 1300 may be a base station as illustrated in any one or more of FIGS. 1, 2, 3, 5, 6, 7, 8, 9, and/or 10.

The base station 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1300 may be configured to perform any one or more of the functions described herein. That is, the processor 1304, as utilized in a base station 1300, may be used to implement any one or more of the processes and procedures described below and illustrated in FIG. 14.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and processor-readable storage media (represented generally by the processor-readable storage medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a communication interface or means for communicating with various other apparatus over a transmission medium. Depending upon the nature of the apparatus, a user interface 1312 (e.g., keypad, display, speaker, microphone, joystick) may also be provided. Of course, such a user interface 1312 is optional, and may be omitted in some examples, such as a base station.

In some aspects of the disclosure, the processor 1304 may include connection management circuitry 1340 configured for various functions, including, for example, establishing a first connection with a user equipment (UE) via a communication link using a first subscription of the UE. For example, the connection management circuitry 1340 may be configured to implement one or more of the functions described below in relation to FIG. 14, including, e.g., block 1402.

In some aspects of the disclosure, the connection management circuitry 1340 may be configured for various functions, including, for example, establishing a second connection with the UE via the communication link using a second subscription of the UE. For example, the connection management circuitry 1340 may be configured to implement one or more of the functions described below in relation to FIG. 14, including, e.g., block 1404.

In some aspects of the disclosure, the processor 1304 may include communication management circuitry 1342 configured for various functions, including, for example, transmitting, to the UE, scheduling information for data communication, the scheduling information including one of an uplink scheduling grant and a downlink scheduling assignment. For example, the communication management circuitry 1342 may be configured to implement one or more of the functions described below in relation to FIG. 14, including, e.g., block 1406.

In some aspects of the disclosure, the communication management circuitry 1342 may be configured for various functions, including, for example, transmitting a subscription indicator indicating at least one of the first subscription or the second subscription that is associated with the data communication to be performed over the communication link based on the scheduling information. For example, the communication management circuitry 1342 may be configured to implement one or more of the functions described below in relation to FIG. 14, including, e.g., block 1408.

The processor 1304 is responsible for managing the bus 1302 and general processing, including the execution of software stored on the processor-readable storage medium 1306. The software, when executed by the processor 1304, causes the processing system 1314 to perform the various functions described below for any particular apparatus. The processor-readable storage medium 1306 and the memory 1305 may also be used for storing data that is manipulated by the processor 1304 when executing software.

One or more processors 1304 in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 1306. The processor-readable storage medium 1306 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 1306 may reside in the processing system 1314, external to the processing system 1314, or distributed across multiple entities including the processing system 1314. The processor-readable storage medium 1306 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In some aspects of the disclosure, the processor-readable storage medium 1306 may include communication link management software/instructions 1350 configured for various functions, including, for example, determining that a first communication link and a second communication link are established with a UE using a first subscription and a second subscription of the UE, respectively, wherein at least one of the first communication link or the second communication link is established between the UE and the base station. For example, the communication link management software/instructions 1350 may be configured to implement one or more of the functions described below in relation to FIG. 14, including, e.g., block 1402.

In some aspects of the disclosure, the processor-readable storage medium 1306 may include communication management software/instructions 1352 configured for various functions, including, for example, coordinating communication of information with the UE via at least one of the first communication link or the second communication link based on the determination, wherein coordinating the communication of information comprises selecting, based on the information, one of (a) the first communication link and the second communication link for communicating the information, or (b) the first communication link or the second communication link for communicating the information without utilizing the other communication link. For example, the communication management software/instructions 1352 may be configured to implement one or more of the functions described below in relation to FIG. 14, including, e.g., block 1404.

In some aspects of the disclosure, the communication management software/instructions 1352 may be configured for various functions, including, for example, communicating the information with the UE via the selected first communication link and/or second communication link. For example, the communication management software/instructions 1352 may be configured to implement one or more of the functions described below in relation to FIG. 14, including, e.g., block 1406.

Figure 14:
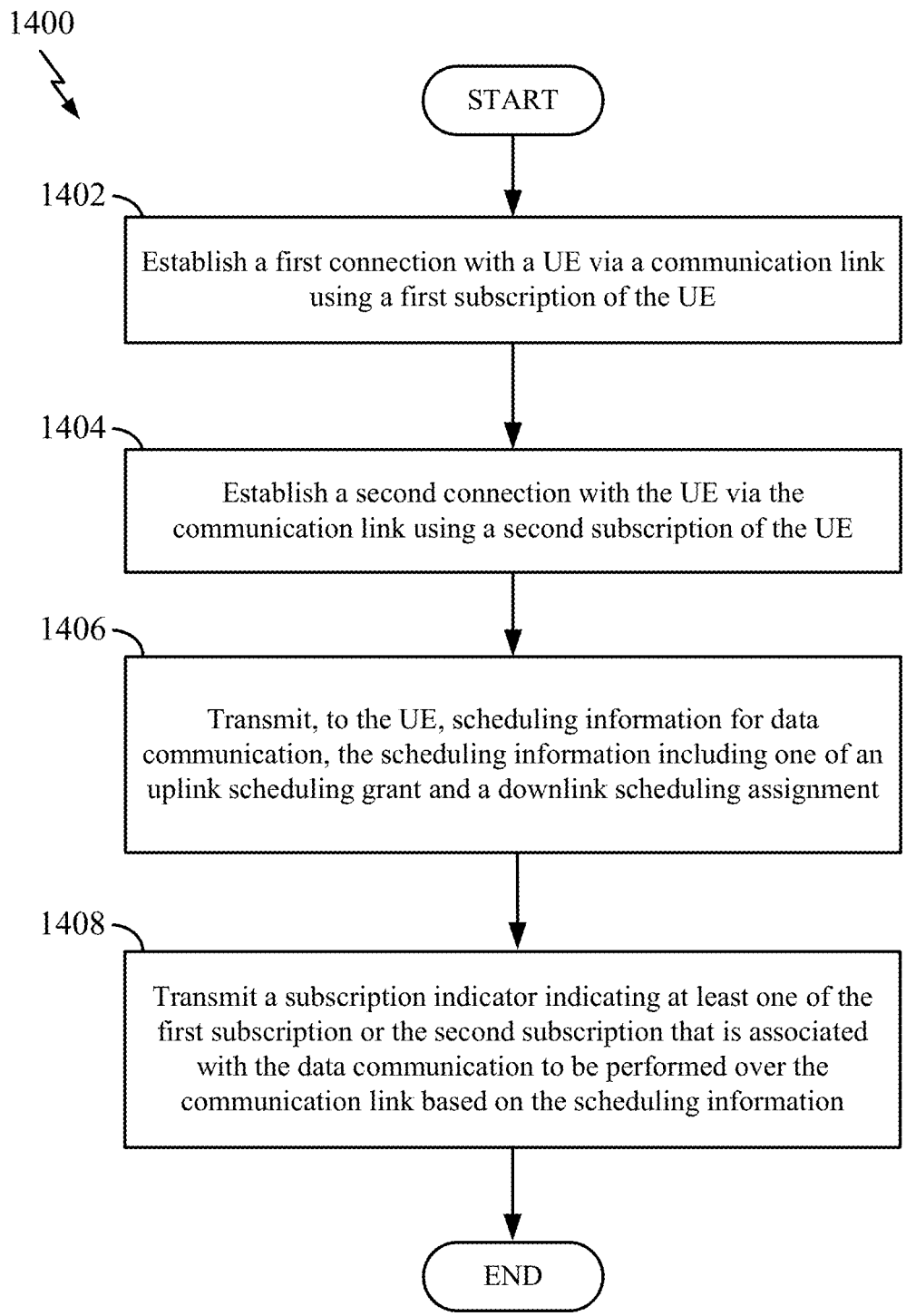
FIG. 14 is a flow chart illustrating an exemplary process for wireless communication by a base station, according to some aspects of the disclosure.

FIG. 14 is a flow chart illustrating an exemplary process 1400 for wireless communication by a base station, in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the base station 1300 illustrated in FIG. 13. In some examples, the process 1400 may be carried out by any suitable apparatus or means for carrying out the functions or algorithm described below.

At block 1402, the process 1400 includes establishing a first connection with a UE via a communication link using a first subscription of the UE.

At block 1404, the process 1400 includes establishing a second connection with the UE via the communication link using a second subscription of the UE. In an aspect, the first connection is a first RRC connection and the second connection is a second RRC connection.

At block 1406, the process 1400 includes transmitting, to the UE, scheduling information for data communication, the scheduling information including one of an uplink scheduling grant and a downlink scheduling assignment.

At block 1408, the process 1400 includes transmitting a subscription indicator indicating at least one of the first subscription or the second subscription that is associated with the data communication to be performed over the communication link based on the scheduling information.

In an aspect, the data communication may be scheduled and performed over the communication link based on the scheduling information using the at least one of the first subscription or the second subscription indicated by the subscription indicator.

In an aspect, the data communication may be uplink communication and may be scheduled and performed based on the scheduling information using the at least one of the first subscription or the second subscription indicated by the subscription indicator if the scheduling information includes the uplink scheduling grant, and the data communication may be downlink communication and may be scheduled and performed based on the scheduling information using the at least one of the first subscription or the second subscription indicated by the subscription indicator if the scheduling information includes the downlink scheduling assignment.

In an aspect, the subscription indicator may be a C-RNTI, and the C-RNTI may be one of a first C-RNTI to indicate the first subscription for the data communication and a second C-RNTI to indicate the second subscription for the data communication. In an aspect, the establishing the first connection may include assigning the first C-RNTI to the first subscription, and the establishing the second connection may include assigning the second C-RNTI to the second subscription. In an aspect, the scheduling information and the subscription indicator may be transmitted via DCI of a PDCCH including the scheduling information scrambled with the C-RNTI.

In an aspect, the subscription indicator may indicate one of a first subscription indicator to indicate the first subscription for the data communication and a second subscription indicator to indicate the second subscription for the data communication. In an aspect, the establishing the first connection may include transmitting a first RRC reconfiguration message including an association between the first subscription indicator and the first subscription, and the establishing the second connection may include transmitting a second RRC reconfiguration message including an association between the second subscription indicator and the second subscription. In an aspect, the scheduling information and the subscription indicator may be received via DCI of a PDCCH, and wherein the subscription indicator may be included in a subscription indicator field of the DCI. In an aspect, wherein the first and second subscriptions may be associated with a same C-RNTI.

In an aspect, the subscription indicator may indicate one of the first subscription and the second subscription for the data communication by indicating an LCG associated with the data communication based on the scheduling information, where the LCG is one of a first LCG to indicate the first subscription for the data communication and a second LCG to indicate the second subscription for the data communication. In an aspect, the establishing the first connection may include transmitting a first RRC reconfiguration message including an association between the first LCG and the first subscription, and the establishing the second connection may include transmitting a second RRC reconfiguration message including an association between the second LCG and the second subscription. In an aspect, the transmitting the scheduling information may include transmitting DCI of a PDCCH, the DCI indicating the LCG for which an uplink grant is provided.

In an aspect, at least one of the establishing the first connection or the establishing the second connection may include transmitting a list of a plurality of LCGs, each LCG of the plurality of LCGs being associated with the first subscription, or the second subscription, or both, where the subscription indicator may indicate an LCG of the plurality of LCGs that is associated with the data communication, the LCG being associated with the at least one of the first subscription or the second subscription. In an aspect, the plurality of LCGs comprise one or more first LCGs associated with the first subscription, one or more second LCGs associated with the second subscription, and one or more third LCGs associated with the first and second subscriptions. In an aspect, subscription indicator may indicate the LCG via a bitmap or an LCG identifier associated with the LCG. In an aspect, the list of the plurality of LCGs may be transmitted via one or more RRC reconfiguration messages. In an aspect, the scheduling information and the subscription indicator may be transmitted via DCI of a PDCCH.

In one configuration, the base station 1300 includes means for means for establishing a first connection with a UE via a communication link using a first subscription of the UE, means for establishing a second connection with the UE via the communication link using a second subscription of the UE, means for transmitting, to the UE, scheduling information for data communication, the scheduling information including one of an uplink scheduling grant and a downlink scheduling assignment, and means for transmitting a subscription indicator indicating at least one of the first subscription or the second subscription that is associated with the data communication to be performed over the communication link based on the scheduling information. In one aspect, the aforementioned means may be the processor(s) 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the processor-readable storage medium 1306, or any other suitable apparatus or means described in any one of the FIGS.

1, 2, 3, 5, 6, 7, 8, 9, and/or 10, and utilizing, for example, the processes and/or algorithms described herein in relation to FIG. 14.

The following provides an overview of several aspects of the present disclosure.

Aspect 1: A method of wireless communication by a user equipment (UE) comprising: establishing a first connection with a base station via a communication link using a first subscription; establishing a second connection with the base station via the communication link using a second subscription; receiving, from the base station, scheduling information for data communication, the scheduling information including one of an uplink scheduling grant and a downlink scheduling assignment; and receiving a subscription indicator indicating at least one of the first subscription or the second subscription to be used for the data communication over the communication link based on the scheduling information.

Aspect 2: The method of aspect 1, wherein the first connection is a first radio resource control (RRC) connection and the second connection is a second RRC connection.

Aspect 3: The method of aspect 1 or 2, further comprising: scheduling and performing the data communication over the communication link based on the scheduling information using the at least one of the first subscription or the second subscription indicated by the subscription indicator.

Aspect 4: The method of aspect 3, wherein the scheduling and performing the data communication comprises: scheduling and performing uplink communication based on the scheduling information using the at least one of the first subscription or the second subscription indicated by the subscription indicator if the scheduling information includes the uplink scheduling grant; and receiving downlink communication based on the scheduling information using the at least one of the first subscription or the second subscription indicated by the subscription indicator if the scheduling information includes the downlink scheduling assignment.

Aspect 5: The method of any of aspects 1 through 4, wherein the subscription indicator is a cell radio network temporary identifier (C-RNTI), and wherein the C-RNTI is one of a first C-RNTI to indicate the first subscription for the data communication and a second C-RNTI to indicate the second subscription for the data communication.

Aspect 6: The method of aspect 5, wherein the establishing the first connection comprises assigning the first C-RNTI to the first subscription, and wherein the establishing the second connection comprises assigning the second C-RNTI to the second subscription.

Aspect 7: The method of aspect 5 or 6, wherein the scheduling information and the subscription indicator are received via downlink control information (DCI) of a physical downlink control channel (PDCCH) including the scheduling information scrambled with the C-RNTI.

Aspect 8: The method of aspect 1, wherein the subscription indicator indicates one of a first subscription indicator to indicate the first subscription for the data communication and a second subscription indicator to indicate the second subscription for the data communication.

Aspect 9: The method of aspect 8, wherein the establishing the first connection comprises receiving a first radio resource control (RRC) reconfiguration message including an association between the first subscription indicator and the first subscription, and wherein the establishing the second connection comprises receiving a second RRC reconfiguration message including an association between the second subscription indicator and the second subscription.

Aspect 10: The method of aspect 8 or 9, wherein the scheduling information and the subscription indicator are received via downlink control information (DCI) of a physical downlink control channel (PDCCH), and wherein the subscription indicator is included in a subscription indicator field of the DCI.

Aspect 11: The method of any of aspects 8 through 10, wherein the first and second subscriptions are associated with a same cell radio network temporary identifier (C-RNTI).

Aspect 12: The method of aspect 1, wherein the subscription indicator indicates one of the first subscription and the second subscription for the data communication by indicating a logical channel group (LCG) associated with the data communication based on the scheduling information, and wherein the LCG is one of a first LCG to indicate the first subscription for the data communication and a second LCG to indicate the second subscription for the data communication.

Aspect 13: The method of aspect 12, wherein the establishing the first connection comprises receiving a first radio resource control (RRC) reconfiguration message including an association between the first LCG and the first subscription, and wherein the establishing the second connection comprises receiving a second RRC reconfiguration message including an association between the second LCG and the second subscription.

Aspect 14: The method of aspect 12 or 13, wherein the receiving the scheduling information comprises receiving downlink control information (DCI) of a physical downlink control channel (PDCCH), the DCI indicating the LCG for which an uplink grant is provided.

Aspect 15: The method of any of aspects 1 through 14, wherein at least one of the establishing the first connection or the establishing the second connection comprises: receiving a list of a plurality of logical channel groups (LCGs), each LCG of the plurality of LCGs being associated with the first subscription, or the second subscription, or both, wherein the subscription indicator indicates an LCG of the plurality of LCGs that is associated with the data communication, the LCG being associated with the at least one of the first subscription or the second subscription.

Aspect 16: The method of aspect 15, wherein the plurality of LCGs comprise one or more first LCGs associated with the first subscription, one or more second LCGs associated with the second subscription, and one or more third LCGs associated with the first and second subscriptions.

Aspect 17: The method of aspect 15 or 16, wherein subscription indicator indicates the LCG via a bitmap or an LCG identifier associated with the LCG.

Aspect 18: The method of any of aspects 15 through 17, wherein the list of the plurality of LCGs are received via one or more radio resource control (RRC) reconfiguration messages.

Aspect 19: The method of any of aspects 1 through 18, wherein the scheduling information and the subscription indicator are received via downlink control information (DCI) of a physical downlink control channel (PDCCH).

Aspect 20: A user equipment (UE) comprising: a transceiver configured to communicate with a radio access network, a memory, and a processor communicatively coupled to the transceiver and the memory, wherein the processor and the memory are configured to perform any one of aspects 1 through 19.

Aspect 21: A UE configured for wireless communication comprising at least one means for performing any one of aspects 1 through 19.

Aspect 22: A non-transitory processor-readable storage medium having instructions for a UE thereon, wherein the instructions, when executed by a processing circuit, cause the processing circuit to perform any one of aspects 1 through 19.

Aspect 23. A method of wireless communication by a base station, comprising:
establishing a first connection with a user equipment (UE) via a communication link using a first subscription of the UE; establishing a second connection with the UE via the communication link using a second subscription of the UE; transmitting, to the UE, scheduling information for data communication, the scheduling information including one of an uplink scheduling grant and a downlink scheduling assignment; and transmitting a subscription indicator indicating at least one of the first subscription or the second subscription that is associated with the data communication to be performed over the communication link based on the scheduling information.

Aspect 24. The method of aspect 23, wherein the first connection is a first radio resource control (RRC) connection and the second connection is a second RRC connection.

Aspect 25. The method of aspect 23 or 24, wherein the data communication is scheduled and performed over the communication link based on the scheduling information using the at least one of the first subscription or the second subscription indicated by the subscription indicator.

Aspect 26. The method of aspect 25, wherein the data communication is uplink communication and is scheduled and performed based on the scheduling information using the at least one of the first subscription or the second subscription indicated by the subscription indicator if the scheduling information includes the uplink scheduling grant; and wherein the data communication is downlink communication and is scheduled and performed based on the scheduling information using the at least one of the first subscription or the second subscription indicated by the subscription indicator if the scheduling information includes the downlink scheduling assignment.

Aspect 27. The method of any of aspects 23 through 26, wherein the subscription indicator is a cell radio network temporary identifier (C-RNTI), and wherein the C-RNTI is one of a first C-RNTI to indicate the first subscription for the data communication and a second C-RNTI to indicate the second subscription for the data communication.

Aspect 28. The method of aspect 27, wherein the establishing the first connection comprises assigning the first C-RNTI to the first subscription, and wherein the establishing the second connection comprises assigning the second C-RNTI to the second subscription.

Aspect 29. The method of aspect 27 or 28, wherein the scheduling information and the subscription indicator are transmitted via downlink control information (DCI) of a physical downlink control channel (PDCCH) including the scheduling information scrambled with the C-RNTI.

Aspect 30. The method of aspect 23, wherein the subscription indicator indicates one of a first subscription indicator to indicate the first subscription for the data communication and a second subscription indicator to indicate the second subscription for the data communication.

Aspect 31. The method of aspect 30, wherein the establishing the first connection comprises transmitting a first radio resource control (RRC) reconfiguration message including an association between the first subscription indicator and the first subscription, and wherein the establishing the second connection comprises transmitting a second RRC reconfiguration message including an association between the second subscription indicator and the second subscription.

Aspect 32. The method of aspect 30 or 31, wherein the scheduling information and the subscription indicator are received via downlink control information (DCI) of a physical downlink control channel (PDCCH), and wherein the subscription indicator is included in a subscription indicator field of the DCI.

Aspect 33. The method of any of aspects 30 through 32, wherein the first and second subscriptions are associated with a same cell radio network temporary identifier (C-RNTI).

Aspect 34. The method of aspect 23, wherein the subscription indicator indicates one of the first subscription and the second subscription for the data communication by indicating a logical channel group (LCG) associated with the data communication based on the scheduling information, and wherein the LCG is one of a first LCG to indicate the first subscription for the data communication and a second LCG to indicate the second subscription for the data communication.

Aspect 35. The method of aspect 34, wherein the establishing the first connection comprises transmitting a first radio resource control (RRC) reconfiguration message including an association between the first LCG and the first subscription, and wherein the establishing the second connection comprises transmitting a second RRC reconfiguration message including an association between the second LCG and the second subscription.

Aspect 36. The method of aspect 34 or 35, wherein the transmitting the scheduling information comprises transmitting downlink control information (DCI) of a physical downlink control channel (PDCCH), the DCI indicating the LCG for which an uplink grant is provided.

Aspect 37. The method of any of aspects 23 through 36, wherein at least one of the establishing the first connection or the establishing the second connection comprises: transmitting a list of a plurality of logical channel groups (LCGs), each LCG of the plurality of LCGs being associated with the first subscription, or the second subscription, or both, wherein the subscription indicator indicates an LCG of the plurality of LCGs that is associated with the data communication, the LCG being associated with the at least one of the first subscription or the second subscription.

Aspect 38. The method of aspect 37, wherein the plurality of LCGs comprise one or more first LCGs associated with the first subscription, one or more second LCGs associated with the second subscription, and one or more third LCGs associated with the first and second subscriptions.

Aspect 39. The method of aspect 37 or 38, wherein subscription indicator indicates the LCG via a bitmap or an LCG identifier associated with the LCG.

Aspect 40. The method of any of aspects 37 through 39, wherein the list of the plurality of LCGs are transmitted via one or more radio resource control (RRC) reconfiguration messages.

Aspect 41. The method of any of aspects 23 through 40, wherein the scheduling information and the subscription indicator are transmitted via downlink control information (DCI) of a physical downlink control channel (PDCCH).

Aspect 42: A base station comprising: a transceiver configured to communicate with a radio access network, a memory, and a processor communicatively coupled to the transceiver and the memory, wherein the processor and the memory are configured to perform any one of aspects 23 through 41.

Aspect 43: A base station configured for wireless communication comprising at least one means for performing any one of aspects 23 through 41.

Aspect 44: A non-transitory processor-readable storage medium having instructions for a base station thereon, wherein the instructions, when executed by a processing circuit, cause the processing circuit to perform any one of aspects 23 through 41.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication by a user equipment (UE) comprising:
    establishing a first connection with a base station via a communication link using a first subscription;
    establishing a second connection with the base station via the communication link using a second subscription;
    receiving, from the base station, scheduling information for data communication, the scheduling information including one of an uplink scheduling grant and a downlink scheduling assignment; and
    receiving a subscription indicator indicating at least one of the first subscription or the second subscription to be used for the data communication over the communication link based on the scheduling information,
    wherein:
        the subscription indicator includes one of a first cell radio network temporary identifier (C-RNTI) associated with the first subscription and a second C-RNTI associated with the second subscription, wherein the subscription indicator including the first C-RNTI indicates to use the first subscription for the data communication over the communication link and the subscription indicator including the second C-RNTI indicates to use the second subscription for the data communication over the communication link, or
        the subscription indicator indicates at least one of the first subscription or the second subscription for the data communication by indicating a logical channel group (LCG) associated with the data communication based on the scheduling information.

2. The method of claim 1, further comprising:
    scheduling and performing the data communication over the communication link based on the scheduling information using the at least one of the first subscription or the second subscription indicated by the subscription indicator.

3. The method of claim 2, wherein the scheduling and performing the data communication comprises:
  scheduling and performing uplink communication based on the scheduling information using the at least one of the first subscription or the second subscription indicated by the subscription indicator when the scheduling information includes the uplink scheduling grant; and
  receiving downlink communication based on the scheduling information using the at least one of the first subscription or the second subscription indicated by the subscription indicator when the scheduling information includes the downlink scheduling assignment.

4. The method of claim 1, wherein the scheduling information is scrambled with one of the first C-RNTI to indicate the first subscription for the data communication and the second C-RNTI to indicate the second subscription for the data communication.

5. The method of claim 1, wherein the establishing the first connection comprises assigning the first C-RNTI to the first subscription, and
  wherein the establishing the second connection comprises assigning the second C-RNTI to the second subscription.

6. The method of claim 1, wherein the subscription indicator indicates one of the first subscription and the second subscription for the data communication by indicating the LCG associated with the data communication based on the scheduling information, and
  wherein the LCG is one of a first LCG to indicate the first subscription for the data communication and a second LCG to indicate the second subscription for the data communication.

7. The method of claim 6, wherein the establishing the first connection comprises receiving a first radio resource control (RRC) reconfiguration message including an association between the first LCG and the first subscription, and
  wherein the establishing the second connection comprises receiving a second RRC reconfiguration message including an association between the second LCG and the second subscription.

8. The method of claim 1, wherein at least one of the establishing the first connection or the establishing the second connection comprises:
  receiving a list of a plurality of logical channel groups (LCGs), each LCG of the plurality of LCGs being associated with the first subscription, or the second subscription, or both,
  wherein the subscription indicator indicates an LCG of the plurality of LCGs that is associated with the data communication, the LCG being associated with the at least one of the first subscription or the second subscription.

9. The method of claim 8, wherein the plurality of LCGs comprise one or more first LCGs associated with the first subscription, one or more second LCGs associated with the second subscription, and one or more third LCGs associated with the first and second subscriptions.

10. The method of claim 1, wherein the scheduling information and the subscription indicator are received via downlink control information (DCI) of a physical downlink control channel (PDCCH).

11. A user equipment (UE) for wireless communication, comprising:
  at least one processor;
  a transceiver communicatively coupled to the at least one processor; and
  a memory communicatively coupled to the at least one processor,
  wherein the at least one processor is configured to:
    establish a first connection with a base station via a communication link using a first subscription;
    establish a second connection with the base station via the communication link using a second subscription;
    receive, from the base station, scheduling information for data communication, the scheduling information including one of an uplink scheduling grant and a downlink scheduling assignment; and
    receive a subscription indicator indicating at least one of the first subscription or the second subscription to be used for the data communication over the communication link based on the scheduling information,
  wherein:
    the subscription indicator includes one of a first cell radio network temporary identifier (C-RNTI) associated with the first subscription and a second C-RNTI associated with the second subscription, wherein the subscription indicator including the first C-RNTI indicates to use the first subscription for the data communication over the communication link and the subscription indicator including the second C-RNTI indicates to use the second subscription for the data communication over the communication link, or
    the subscription indicator indicates at least one of the first subscription or the second subscription for the data communication by indicating a logical channel group (LCG) associated with the data communication based on the scheduling information.

12. The UE of claim 11, wherein the at least one processor is configured to:
  schedule and perform the data communication over the communication link based on the scheduling information using the at least one of the first subscription or the second subscription indicated by the subscription indicator.

13. A method of wireless communication by a base station, comprising:
  establishing a first connection with a user equipment (UE) via a communication link using a first subscription of the UE;
  establishing a second connection with the UE via the communication link using a second subscription of the UE;
  transmitting, to the UE, scheduling information for data communication, the scheduling information including one of an uplink scheduling grant and a downlink scheduling assignment; and
  transmitting a subscription indicator indicating at least one of the first subscription or the second subscription that is associated with the data communication to be performed over the communication link based on the scheduling information,
  wherein:
    the subscription indicator includes one of a first cell radio network temporary identifier (C-RNTI) associated with the first subscription and a second C-RNTI associated with the second subscription, wherein the subscription indicator including the first C-RNTI indicates to use the first subscription for the data communication over the communication link and the subscription indicator including the second C-RNTI indicates to use the second subscription for the data communication over the communication link, or the subscription indicator indicates at least one of the first subscription or the second subscription for the data communication by indicating a logical channel group (LCG) associated with the data communication based on the scheduling information.

14. The method of claim 13, wherein the data communication is scheduled and performed over the communication link based on the scheduling information using the at least one of the first subscription or the second subscription indicated by the subscription indicator.

15. A The method of claim 14, wherein the data communication is uplink communication and is scheduled and performed based on the scheduling information using the at least one of the first subscription or the second subscription indicated by the subscription indicator when the scheduling information includes the uplink scheduling grant; and wherein the data communication is downlink communication and is scheduled and performed based on the scheduling information using the at least one of the first subscription or the second subscription indicated by the subscription indicator when the scheduling information includes the downlink scheduling assignment.

16. The method of claim 13, wherein the scheduling information is scrambled with one of the first C-RNTI to indicate the first subscription for the data communication and the second C-RNTI to indicate the second subscription for the data communication.

17. The method of claim 13, wherein the establishing the first connection comprises assigning the first C-RNTI to the first subscription, and wherein the establishing the second connection comprises assigning the second C-RNTI to the second subscription.

18. The method of claim 13, wherein the subscription indicator indicates one of the first subscription and the second subscription for the data communication by indicating the LCG associated with the data communication based on the scheduling information, and wherein the LCG is one of a first LCG to indicate the first subscription for the data communication and a second LCG to indicate the second subscription for the data communication.

19. The method of claim 18, wherein the establishing the first connection comprises transmitting a first radio resource control (RRC) reconfiguration message including an association between the first LCG and the first subscription, and wherein the establishing the second connection comprises transmitting a second RRC reconfiguration message including an association between the second LCG and the second subscription.

20. The method of claim 13, wherein at least one of the establishing the first connection or the establishing the second connection comprises:

transmitting a list of a plurality of logical channel groups (LCGs), each LCG of the plurality of LCGs being associated with the first subscription, or the second subscription, or both, wherein the subscription indicator indicates an LCG of the plurality of LCGs that is associated with the data communication, the LCG being associated with the at least one of the first subscription or the second subscription.

21. The method of claim 20, wherein the plurality of LCGs comprise one or more first LCGs associated with the first subscription, one or more second LCGs associated with the second subscription, and one or more third LCGs associated with the first and second subscriptions.

22. The method of claim 13, wherein the scheduling information and the subscription indicator are transmitted via downlink control information (DCI) of a physical downlink control channel (PDCCH).

23. A base station for wireless communication, comprising:

at least one processor;

a transceiver communicatively coupled to the at least one processor; and a memory communicatively coupled to the at least one processor, wherein the at least one processor is configured to:

establish a first connection with a user equipment (UE) via a communication link using a first subscription of the UE;

establish a second connection with the UE via the communication link using a second subscription of the UE;

transmit, to the UE, scheduling information for data communication, the scheduling information including one of an uplink scheduling grant and a downlink scheduling assignment; and transmit a subscription indicator indicating at least one of the first subscription or the second subscription that is associated with the data communication to be performed over the communication link based on the scheduling information, wherein:

the subscription indicator includes one of a first cell radio network temporary identifier (C-RNTI) associated with the first subscription and a second C-RNTI associated with the second subscription, wherein the subscription indicator including the first C-RNTI indicates to use the first subscription for the data communication over the communication link and the subscription indicator including the second C-RNTI indicates to use the second subscription for the data communication over the communication link, or the subscription indicator indicates at least one of the first subscription or the second subscription for the data communication by indicating a logical channel group (LCG) associated with the data communication based on the scheduling information.

24. The base station of claim 23, wherein the data communication is scheduled and performed over the communication link based on the scheduling information using the at least one of the first subscription or the second subscription indicated by the subscription indicator.

* * * * *